(12) United States Patent
Matsuura et al.

(10) Patent No.: US 11,199,258 B2
(45) Date of Patent: Dec. 14, 2021

(54) TRANSMISSION

(71) Applicant: HONDA MOTOR CO., LTD., Tokyo (JP)

(72) Inventors: Kohei Matsuura, Wako (JP); Hiroyuki Kojima, Wako (JP); Kazuhiko Nakamura, Wako (JP); Kazumitsu Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 16/367,725

(22) Filed: Mar. 28, 2019

(65) Prior Publication Data
US 2019/0301600 A1 Oct. 3, 2019

(30) Foreign Application Priority Data

Mar. 30, 2018 (JP) .............................. JP2018-068938

(51) Int. Cl.
*F16H 61/04* (2006.01)
*F16H 63/30* (2006.01)

(52) U.S. Cl.
CPC ..... *F16H 61/0403* (2013.01); *F16H 63/3016* (2013.01); *F16H 2061/0407* (2013.01); *F16H 2061/0474* (2013.01); *F16H 2063/3093* (2013.01)

(58) Field of Classification Search
CPC ............. F16H 61/0403; F16H 63/3016; F16H 2061/0474; F16H 2061/0407; F16H 2063/3093; F16H 63/18; F16H 2200/006; F16H 61/688; F16H 3/006; F16H 59/68; F16H 2059/366; F16H 2057/0203; B60Y 2200/12
See application file for complete search history.

(56) References Cited

U.S. PATENT DOCUMENTS

| 9,970,489 B2 * | 5/2018 | Murata .................. F16D 23/06 |
| 2015/0300485 A1 * | 10/2015 | Weingartz ........... F16H 63/3023 74/335 |
| 2017/0241543 A1 * | 8/2017 | Neumann ........... F16H 61/0403 |
| 2017/0248198 A1 * | 8/2017 | Taka ....................... F16H 3/091 |

FOREIGN PATENT DOCUMENTS

| GB | 2142694 A * | 1/1985 | ............. F16D 23/06 |
| JP | 2011-163403 A | 8/2011 | |
| JP | 5313938 B2 | 10/2013 | |
| JP | 2014163468 A * | 9/2014 | |
| JP | 2017003082 A * | 1/2017 | |
| WO | 2013/161698 A1 | 10/2013 | |

OTHER PUBLICATIONS

Office Action, dated Aug. 17, 2020, issued over the corresponding Indian Patent Application No. 201914009584.

* cited by examiner

*Primary Examiner* — Justin Holmes
(74) *Attorney, Agent, or Firm* — Carrier Blackman & Associates, P.C.; Joseph P. Carrier; William D. Blackman

(57) ABSTRACT

A gear shift control system controls an actuator so that a pushing force will be a constant gearing-phase pushing force, during a gearing phase. The gear shift control system performs control on the basis of the number of rotation of the engine in the gearing phase, which is measured at the start of the gearing phase, so that the constant gearing-phase pushing force will increase as a number of rotation of the engine in the gearing phase increases. Thus, the hitting sound due to collision between the sleeve and the shift gear in shifting gears is reduced.

11 Claims, 13 Drawing Sheets

TRANSMISSION

BACKGROUND

1. Technical Field

The present invention relates to a transmission with a synchronizer for a saddled vehicle.

2. Description of the Background

A transmission with a synchronizer having a sleeve, a hub, and a blocking ring is used to shift gears. When a driver operates for acceleration, to make the sleeve move to the shift gear in a time as short as possible by applying a pushing force, the moving speed of the sleeve of the transmission may be controlled to increase as a measured or an estimated acceleration in a front-rear direction of a vehicle increases. One such existing technique is disclosed in Patent Literature 1.

The transmission having such a synchronizer may be employed as a transmission of a saddled vehicle. In this case, the transmission is incorporated in a power unit that is fixed to a vehicle body in an exposed manner, and thus, it is easy for a rider to hear a hitting sound due to collision between sleeve teeth of the synchronizer and dog teeth of the shift gear. For this reason, it is necessary to reduce the hitting sound due to collision between the sleeve teeth and the dog teeth in shifting gears.

CITATION LIST

Patent Literature

Patent Literature 1: Japanese Patent No. 5313938

BRIEF SUMMARY

An object of the present invention is to provide a transmission with a synchronizer for a saddled vehicle, in which a power unit is fixed to a vehicle body in an exposed manner. This transmission reduces a hitting sound due to collision between a sleeve and a shift gear, when a number of rotation of an engine is low, and the hitting sound due to collision between the sleeve and the shift gear is easily heard. Moreover, the transmission satisfies a request of a driver for rapid shifting of gears, when the number of rotation of the engine is high, and the hitting sound due to collision between the sleeve and the shift gear is buried in an engine sound and is relatively hard to hear.

The present invention provides a transmission to be contained in a power unit for a saddled vehicle having an internal-combustion engine. The transmission includes driving shafts that receive power from a crankshaft of the internal-combustion engine, an output shaft that receives the power from the crankshaft, a gear group that transmits the power from the driving shafts to the output shaft, and a shift gear. The shift gear is included in multiple gears of the gear group, and the shift gear is relatively rotatably supported by at least one shaft of the driving shafts and the output shaft and has gear dog teeth. The transmission also includes a gear switching mechanism that has a sleeve and a blocking ring. The sleeve is supported by the one shaft in a movable manner in an axial direction while relative rotation is inhibited. The blocking ring is disposed between the shift gear and the sleeve. The blocking ring has ring teeth that are interposed between sleeve teeth of the sleeve and the gear dog teeth. The sleeve is configured to move to make an inner circumferential surface of the blocking ring come into contact with a protruding cylindrical part of the shift gear, whereby the sleeve synchronizes with the shift gear. The sleeve is configured to further move to make the sleeve teeth come into contact and mesh with the ring teeth and then make the sleeve teeth come into contact and mesh with the gear dog teeth, whereby the sleeve engages with the shift gear, resulting in establishment of a speed stage. The transmission also includes a gear shift operation mechanism that makes the sleeve move in the axial direction by applying a pushing force for pushing the sleeve to the shift gear. The pushing force is generated by a driving force of an actuator. The transmission further includes an engine speed measuring unit that measures a number of rotation of an engine of the internal-combustion engine, a sleeve position measuring unit that measures a position of the sleeve, and a gear shift control system that controls the gear switching mechanism. The gear shift control system controls the actuator so that the pushing force is controlled to be a constant gearing-phase pushing force during a gearing phase. The gearing phase starts a predetermined time before tips of the sleeve teeth of the sleeve come into collision with tips of the gear dog teeth of the shift gear and ends when a predetermined time passes after the collision between the sleeve teeth and the gear dog teeth. The gearing-phase pushing force is controlled on the basis of a number of rotation of the engine in the gearing phase, which is measured at the start of the gearing phase, so as to increase as the number of rotation of the engine in the gearing phase increases.

The transmission having the above-described structure may be used in a saddled vehicle, in which an internal-combustion engine is exposed to the outside and is disposed so as to be close to a driver, whereby a hitting sound due to collision between a sleeve and a gear is easily heard. In this case, the transmission reduces a hitting sound due to collision between sleeve teeth of the sleeve and dog teeth of a shift gear, by decreasing the pushing force for the sleeve, when a number of rotation of the engine is low, and an engine sound is small. The transmission provides a high shifting speed by increasing the pushing force, when the number of rotation of the engine is high, and the hitting sound due to collision is buried in a large engine sound and is hard for a driver to hear. Thus, the transmission satisfies a request of a driver for rapid shifting of the gears, which tends to occur when the number of rotation of the engine is high.

In the above-described structure, the gear shift control system may operate using a number of rotation for starting changing the driving force in the gearing phase, which is set relative to the number of rotation of the engine in the gearing phase. When the number of rotation of the engine in the gearing phase is lower than the number of rotation for starting changing the driving force in the gearing phase, the gear shift control system may control the gearing-phase pushing force to be a predetermined gearing-phase first fixed value regardless of the number of rotation of the engine in the gearing phase. The gearing-phase first fixed value is not greater than a calculated gearing-phase pushing force at the number of rotation for starting changing the driving force in the gearing phase.

This operation prevents an excessive decrease in the shifting speed and enables maintaining a lowest acceptable shifting speed when the number of rotation of the engine is low.

In the above-described structure, the gear shift control system may also operate using a number of rotation for finishing changing the driving force in the gearing phase, which is set relative to the number of rotation of the engine in the gearing phase so as to be higher than the number of rotation for starting changing the driving force in the gearing phase. When the number of rotation of the engine in the gearing phase is higher than the number of rotation for finishing changing the driving force in the gearing phase, the gear shift control system may control the gearing-phase pushing force to be a predetermined gearing-phase second fixed value. The gearing-phase second fixed value is not less than a calculated gearing-phase pushing force at the number of rotation for finishing changing the driving force in the gearing phase.

This operation prevents an excessive increase in the shifting speed when the number of rotation of the engine is high, thereby reducing the hitting sound due to collision, resulting in protection of the sleeve and the gear. Moreover, this operation makes the change in the shifting speed unnoticeable to a driver. Accordingly, both reduction of the hitting sound due to collision and improvement of the shifting speed are achieved.

In the above-described structure, the gear switching mechanism may perform a gear shift operation including a neutral phase, a sleeve moving phase, a synchronizing phase, the gearing phase, and a pushing phase. During the neutral phase, the sleeve does not move to the shift gear. The sleeve moving phase starts when the sleeve starts moving and ends before the blocking ring is pressed against the protruding cylindrical part of the shift gear, thereby starting to generate friction, and the sleeve starts synchronizing with the shift gear. The synchronizing phase starts at the start of the synchronization and ends before the start of the gearing. The gearing phase starts at the start of the gearing and ends before the end of the gearing after the sleeve teeth of the sleeve push aside the ring teeth of the blocking ring and come into collision with the gear dog teeth of the shift gear. The pushing phase starts at the end of the gearing and ends when the sleeve teeth come into collision with a gear wall of the shift gear, whereby shifting of the gears is completed. The gear shift control system may execute, in the synchronizing phase, a gear shift control using a constant synchronizing-phase pushing force as the pushing force. The gear shift control system may perform control on the basis of the number of rotation of the engine in the synchronizing phase, which is measured at the start of the synchronizing phase, so that the constant synchronizing-phase pushing force will increase as the number of rotation of the engine in the synchronizing phase increases.

This operation reduces the hitting sound due to collision between the sleeve teeth of the sleeve and the dog teeth of the shift gear, by decreasing the pushing force for the sleeve, when the number of rotation of the engine is low, and an engine sound is small. This operation provides a high shifting speed by increasing the pushing force, when the number of rotation of the engine is high, and the hitting sound due to collision is buried in a large engine sound and is hard for a driver to hear. Thus, this operation satisfies a request of a driver for rapid shifting of the gears, which tends to occur when the number of rotation of the engine is high. In the above-described structure, the synchronizing-phase pushing force is controlled on the basis of the number of rotation of the engine at the start of the synchronizing phase, in the synchronizing phase that is immediately before the gearing phase in which the hitting sound occurs due to collision between the sleeve teeth of the sleeve and the dog teeth of the shift gear. Thus, the above-described structure reduces the hitting sound due to collision and provides rapid shifting of the gears, which may satisfy a request of a driver.

In the above-described structure, the gear shift control system may also operate using a number of rotation for starting changing the driving force in the synchronizing phase, which is set relative to the number of rotation of the engine in the synchronizing phase. When the number of rotation of the engine in the synchronizing phase is lower than the number of rotation for starting changing the driving force in the synchronizing phase, the gear shift control system may control the synchronizing-phase pushing force to be a predetermined synchronizing-phase first fixed value regardless of the number of rotation of the engine in the synchronizing phase. The synchronizing-phase first fixed value is not greater than a calculated synchronizing-phase pushing force at the number of rotation for starting changing the driving force in the synchronizing phase.

This operation prevents an excessive decrease in the shifting speed and enables maintaining a lowest acceptable shifting speed when the number of rotation of the engine is low.

In the above-described structure, the gear shift control system may also operate using a number of rotation for finishing changing the driving force in the synchronizing phase, which is set relative to the number of rotation of the engine in the synchronizing phase so as to be higher than the number of rotation for starting changing the driving force in the synchronizing phase. When the number of rotation of the engine in the synchronizing phase is higher than the number of rotation for finishing changing the driving force in the synchronizing phase, the gear shift control system may control the synchronizing-phase pushing force to be a predetermined synchronizing-phase second fixed value. The synchronizing-phase second fixed value is not less than a calculated synchronizing-phase pushing force at the number of rotation for finishing changing the driving force in the synchronizing phase.

This operation prevents an excessive increase in the shifting speed when the number of rotation of the engine is high and reduces the hitting sound due to collision, resulting in protection of the sleeve and the gear. Moreover, this operation makes the change in the shifting speed unnoticeable to a driver. Accordingly, both reduction of the hitting sound due to collision and improvement of the shifting speed are achieved.

In the above-described structure, during the pushing phase, a feedback control may be executed by using a difference of a current position from a target position of the sleeve as an input value for controlling the shifting of the gears.

In the above-described structure, the pushing force is controlled to increase the shifting speed in the pushing phase. This control is performed because the hitting sound that is generated in the pushing phase is small compared with that in the gearing phase.

The transmission according to the present invention may be employed as a transmission of a saddled vehicle, in which a power unit is fixed to a vehicle body in an exposed manner. In this case, the transmission reduces a hitting sound due to collision between a sleeve and a shift gear, when a number of rotation of an engine is low, and the hitting sound due to collision between the sleeve and the shift gear is easily heard. Moreover, the transmission satisfies a request of a driver for rapid shifting of the gears, when the number of rotation of the engine is high, and the hitting sound due to collision between the sleeve and the shift gear is buried in an engine sound and is relatively hard to hear.

DETAILED DESCRIPTION

A transmission T of a power unit P according to an embodiment of the present invention will be described with reference to the attached drawings.

In descriptions in this specification and in claims, a front-rear direction, a left-right direction, and an up-down direction represent directions relative to a vehicle in a condition in which a power unit according to the present invention is mounted on a vehicle, in particular, a motorcycle. The drawings show arrows FR, RE, RH, LH, UP, and DW, which represent a front direction, a rear direction, a right-hand direction, a left-hand direction, an upward direction, and a downward direction, respectively.

Figure 1:
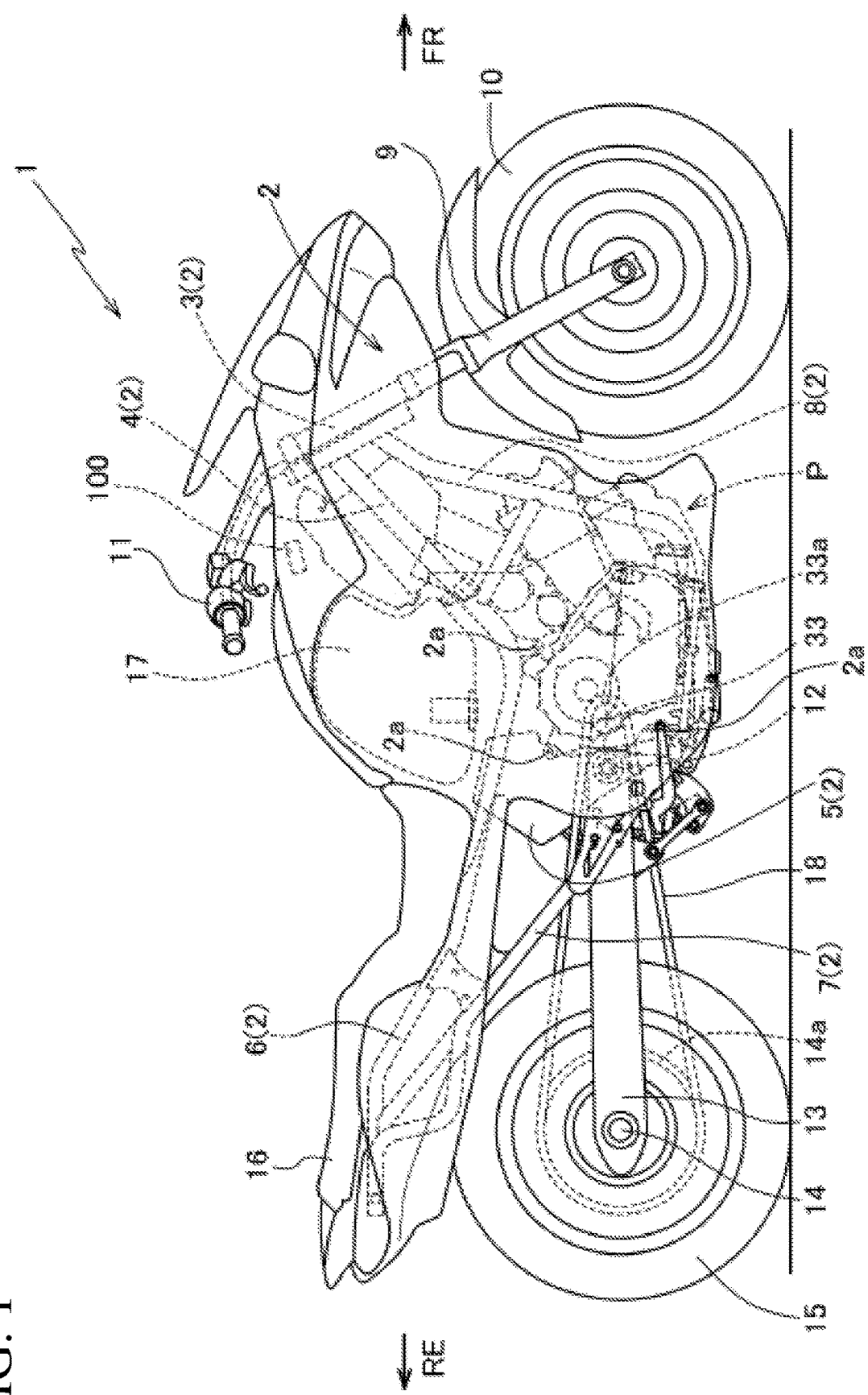
FIG. 1 is a right side view of a motorcycle mounted with a power unit of an embodiment of the present invention.

FIG. 1 shows a motorcycle 1 having a body frame 2. The body frame 2 includes a head tube 3, a main frame member 4, a center frame member 5, a seat stay 6, a middle stay 7, and a down frame 8. The head tube 3 is disposed on a front part of the body frame 2. The main frame member 4 obliquely extends downward rearward from the head tube 3, bends at a midway part, and further extends rearward. The center frame member 5 extends downward from a rear end of the main frame member 4. The seat stay 6 extends from an upper part of the center frame member 5 in the rear direction. The middle stay 7 is disposed between a rear part of the center frame member 5 and a rear part of the seat stay 6. The down frame 8 extends downward from the head tube 3.

The head tube 3 steerably supports a front fork 9 that rotatably supports a front wheel 10 at a lower end part. The front fork 9 is connected to a steering handlebar 11 at an upper end part. The center frame member 5 swingably supports a swing arm 13 via a pivot shaft 12. The swing arm 13 rotatably supports a rear wheel 15 at a rear end via a rear wheel shaft 14.

The seat stay 6 has a passenger seat 16 that is mounted thereover. The passenger seat 16 has a fuel tank 17 in front thereof, and the fuel tank 17 is mounted over the main frame member 4.

The motorcycle 1 is mounted with the power unit P in which a rotation axis of a crankshaft 23 is directed in a left-right direction. The power unit P operates for driving the rear wheel 15. The power unit P has an output shaft 33 to which a driving sprocket 33a is fitted. The rear wheel shaft 14 has a driven sprocket 14a that is fitted thereto. The driving sprocket 33a and the driven sprocket 14a have an endless chain 18 that is stretched therebetween.

The power unit P is supported at a front part, a center upper part, a rear upper part, and a rear lower part by multiple engine hangers 2a that are provided to the body frame 2. The engine hanger 2a that supports the rear lower part of the power unit P is positioned under an even-numbered stage shaft 32, which is described later.

Figure 2:
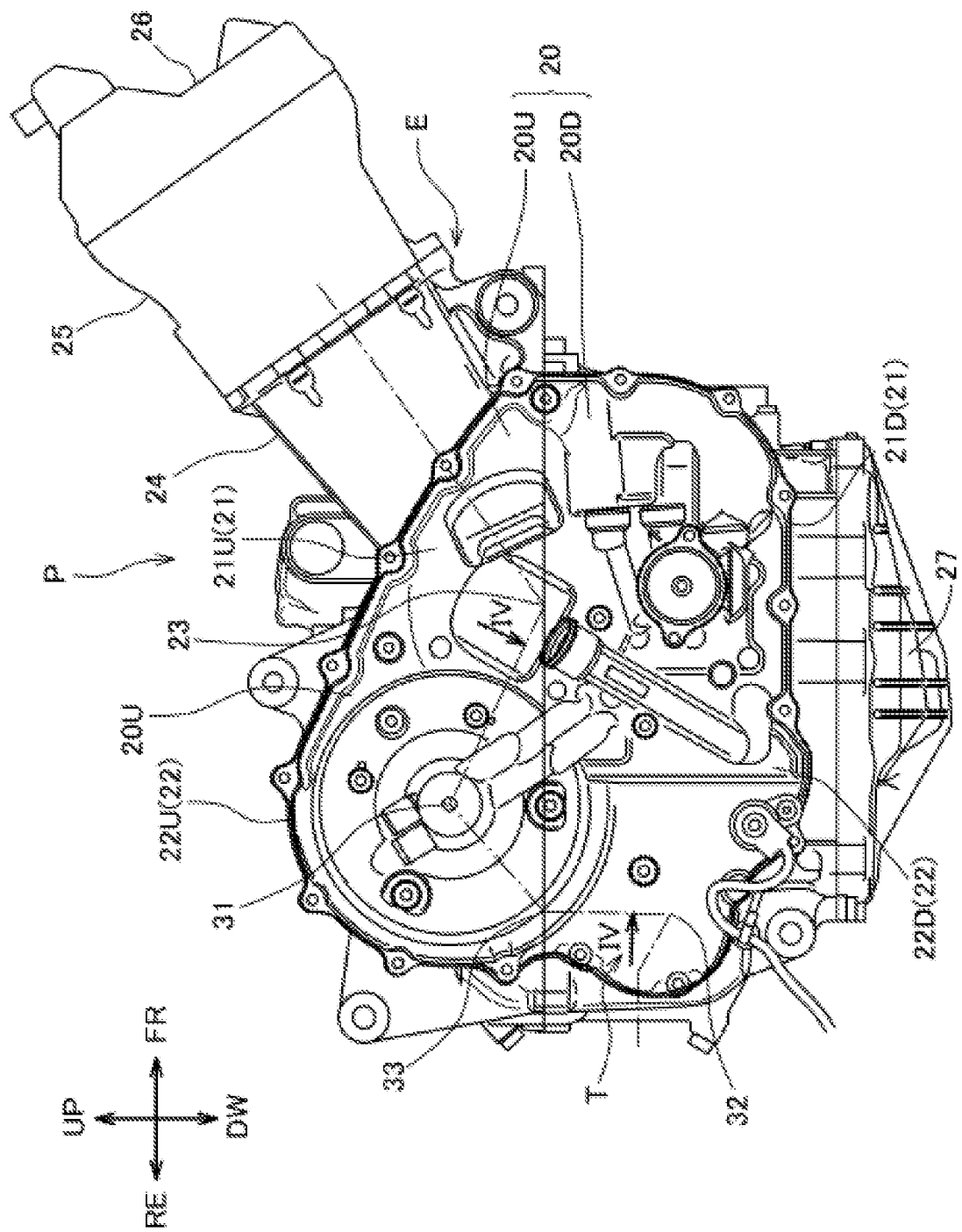
FIG. 2 is a right side view of the power unit.

As shown in FIG. 2, the power unit P includes a water-cooled, 2-cylinder, 4-stroke cycle internal-combustion engine (hereinafter called "internal-combustion engine") E and a transmission T that are combined together. The transmission T is connected to the rear of the internal-combustion engine E. The transmission T performs a gear shift operation under control of a gear shift control system 100 that is mounted on the motorcycle 1. The internal-combustion engine E is provided with an engine speed measuring unit 101 that measures a number Ne of rotation of the engine. The measured number Ne of rotation of the engine is sent to the gear shift control system 100.

The power unit P includes an unit case 20 that has a crankcase 21 as a front half part and a transmission case 22 as a rear half part, which are integrally formed in the front-rear direction. The crankcase 21 rotatably supports the crankshaft 23. The transmission case 22 houses a transmission mechanism 30 of the transmission T. The unit case 20 is constituted of upper and lower divided parts: an upper unit-case half part 20U and a lower unit-case half part 20D. The upper unit-case half part 20U includes an upper crankcase half part 21U and an upper transmission-case half part 22U, which are integrally formed. The lower unit-case half part 20D includes a lower crankcase half part 21D and a lower transmission-case half part 22D, which are integrally formed.

The upper crankcase half part 21U has an upper part on which a cylinder block 24, a cylinder head 25, and a head cover 26 are sequentially stacked in an oblique upward direction toward the front direction so as to protrude in a forward tilting manner.

The lower unit-case half part 20D has a lower side that is closed with an oil pan 27.

Figure 6:
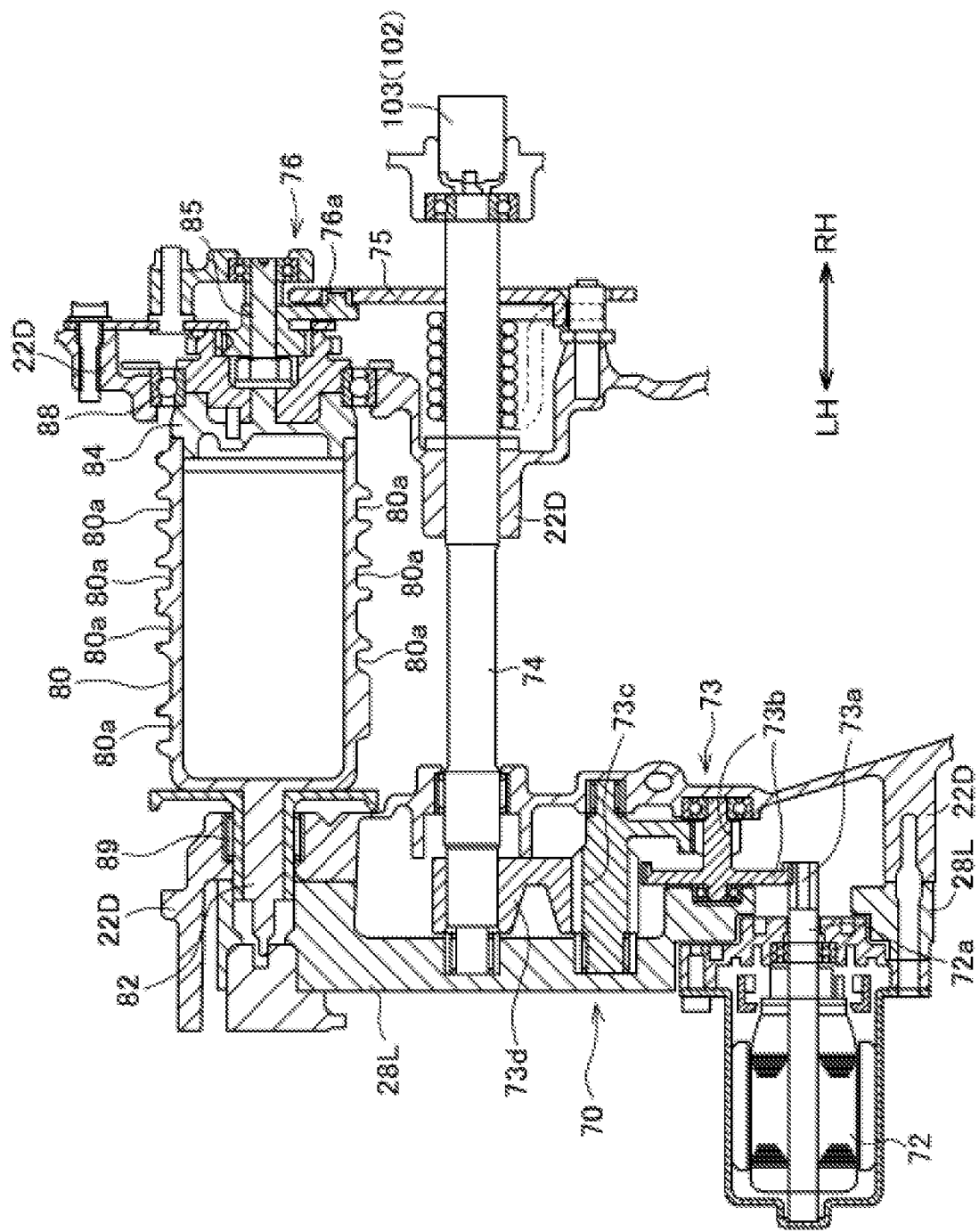
FIG. 6 is a sectional view of the periphery of a transmission.

The unit case 20 has a right side that is covered with a right unit-case cover 28R and has a left side that is covered with a left unit-case cover 28L (refer to FIG. 6).

The crankshaft 23 is held by the upper crankcase half part 21U and the lower crankcase half part 21D via bearings, which are not shown, thereby being rotatably supported by the crankcase 21.

Figure 4:
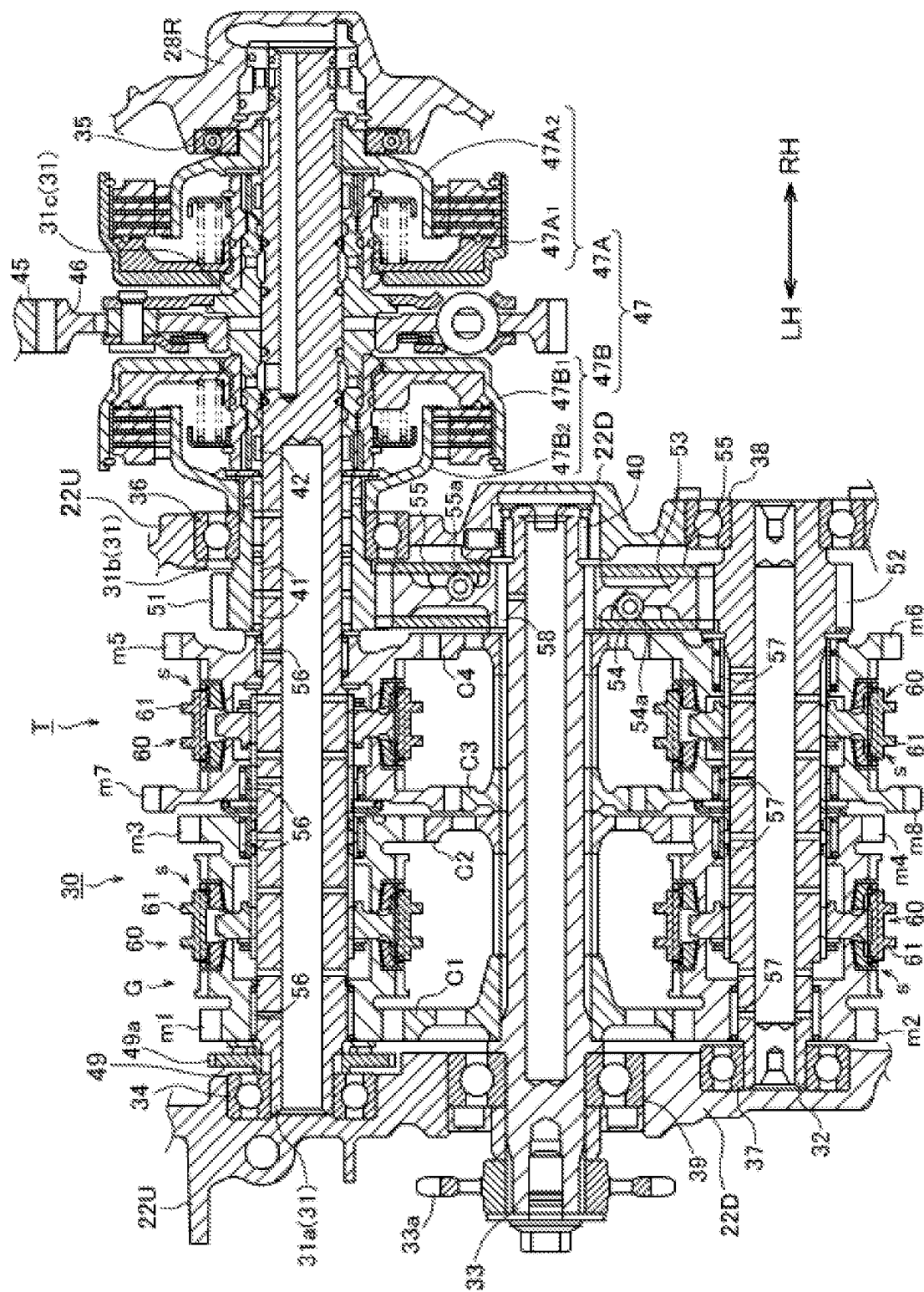
FIG. 4 is a sectional view taken along a line IV-IV in FIG. 2.
Figure 5:
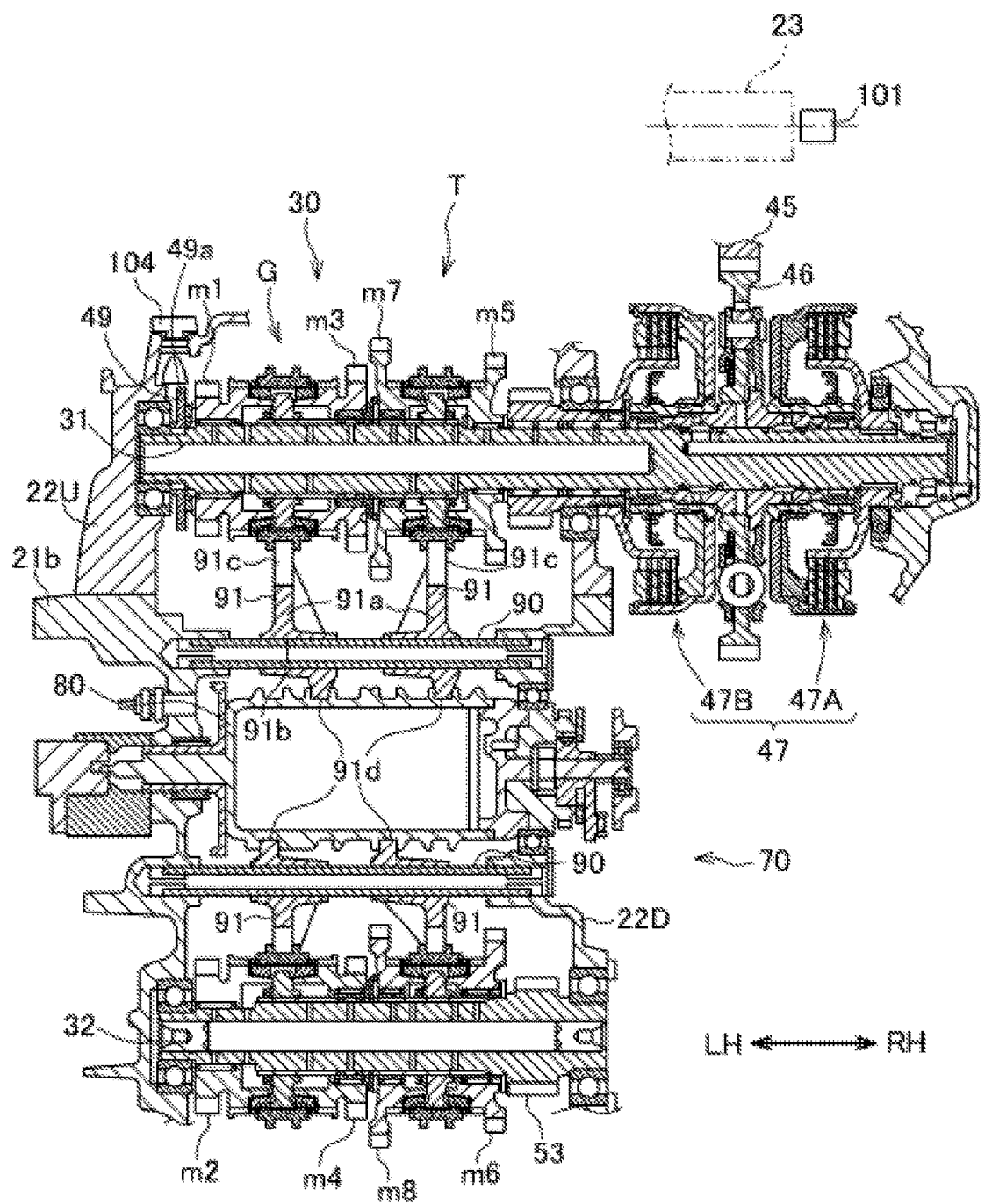
FIG. 5 is a sectional view taken along a line V-V in FIG. 3.

As shown in FIGS. 4 to 6, the transmission T that transmits a driving force of the internal-combustion engine E to a shifted gear of a predetermined speed stage includes a constant-mesh transmission mechanism 30, a gear shift operation mechanism 70, and a clutch unit 47. The gear shift operation mechanism 70 controls speed stages of the transmission mechanism 30. The clutch unit 47 has a first clutch 47A and a second clutch 47B, which is generally called a twin clutch. The transmission T is configured to have 8 forward speed stages.

As shown in FIGS. 4 and 5, the transmission mechanism 30 of the transmission T includes an odd-numbered stage shaft 31, an even-numbered stage shaft 32, the output shaft 33, and a gear group G. The odd-numbered stage shaft 31 is an input shaft and is disposed with driving gears m1, m3, m5, and m7 of odd-numbered stages. The even-numbered stage shaft 32 receives a rotational driving force from the odd-numbered stage shaft 31 and is disposed with driving gears m2, m4, m6, and m8 of even-numbered stages. The output shaft 33 has driven gears c1 to c4 with which the driving gears m1 to m8 of the odd-numbered stages and the even-numbered stages respectively mesh. The gear group G has the driving gears m1 to m8 of the odd-numbered stages and the even-numbered stages and the driven gears c1 to c4. The odd-numbered stage shaft 31, the even-numbered stage shaft 32, the output shaft 33, a shift drum 80, and a shift fork shaft 90 are disposed in parallel to the crankshaft 23 and are directed in the left-right direction. The shift drum 80 and the shift fork shaft 90 are described later.

Figure 3:
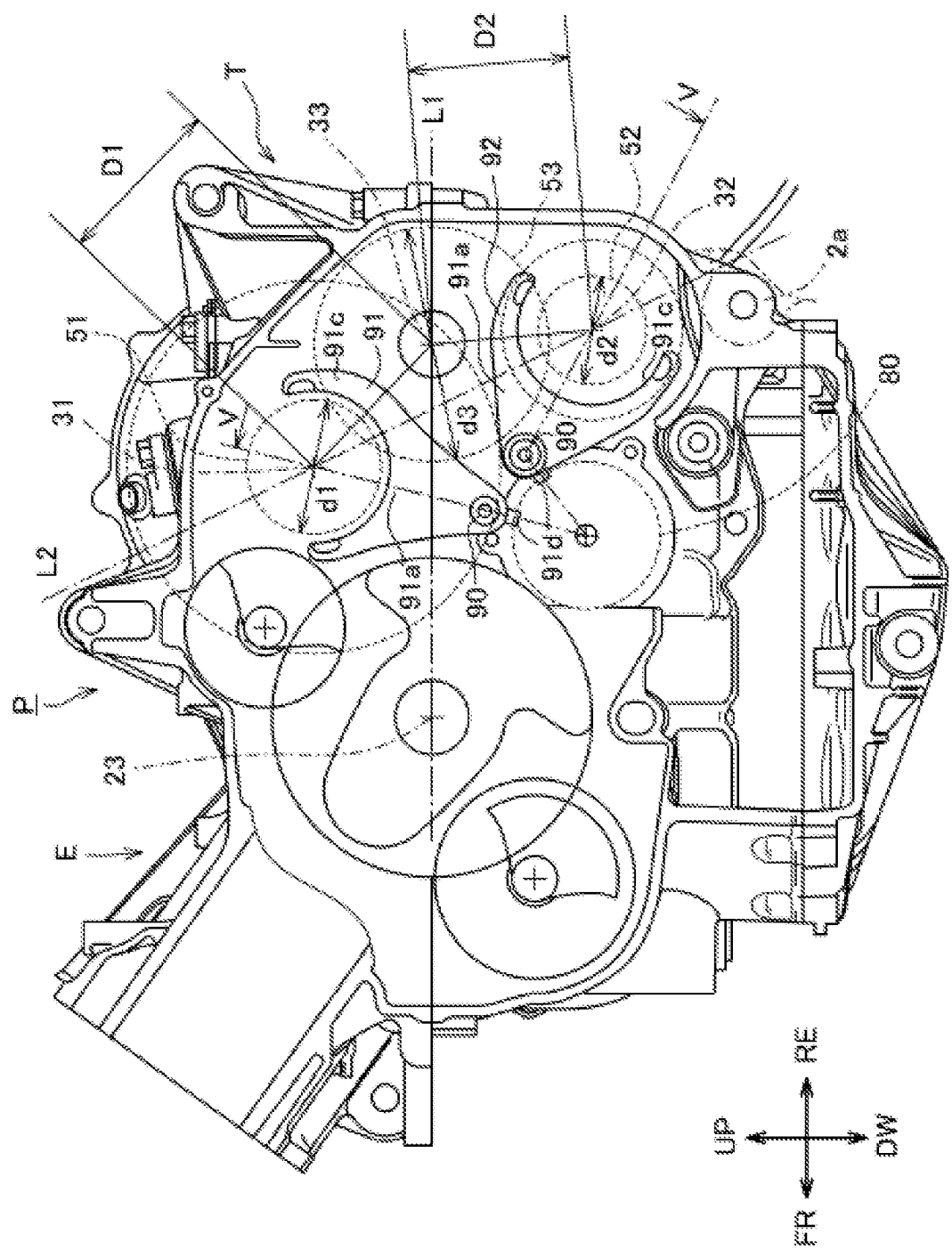
FIG. 3 is a left side view of the power unit of which an unit case cover is removed.

FIG. 3 shows the crankshaft 23, the odd-numbered stage shaft 31, the even-numbered stage shaft 32, and the shift drum 80 as viewed from a side of the vehicle. The output shaft 33 is disposed rearward of the crankshaft 23. The odd-numbered stage shaft 31 and the even-numbered stage shaft 32 are disposed rearward of the crankshaft 23. In addition, the odd-numbered stage shaft 31 is provided on a side opposite to the even-numbered stage shaft 32 relative to a line L1 connecting the crankshaft 23 and the output shaft 33. The shift drum 80 is disposed on a side opposite to the output shaft 33 relative to a line L2 connecting the odd-numbered stage shaft 31 and the even-numbered stage shaft 32. One or both of the odd-numbered stage shaft 31 and the even-numbered stage shaft 32 are disposed between the crankshaft 23 and the output shaft 33 in the front-rear direction of the vehicle. In this embodiment, the odd-numbered stage shaft 31 is disposed between the crankshaft 23 and the output shaft 33. The odd-numbered stage shaft 31, the even-numbered stage shaft 32, and the output shaft 33 are arranged so that a center distance D1 between the odd-numbered stage shaft 31 and the output shaft 33 will be longer than a center distance D2 between the even-numbered stage shaft 32 and the output shaft 33.

As shown in FIG. 3, the odd-numbered stage shaft 31 is disposed rearward of the crankshaft 23 in an oblique upward direction, to the upper transmission-case half part 22U. As shown in FIG. 4, the odd-numbered stage shaft 31 includes an odd-numbered stage main shaft 31a, a power-transmission outer shaft 31b, and a clutch outer shaft 31c. The odd-numbered stage main shaft 31a receives a rotational driving force from the crankshaft 23 via the first clutch 47A. The power-transmission outer shaft 31b is relatively rotatably disposed to cover an approximately center of the odd-numbered stage main shaft 31a and transmits a rotational driving force to the even-numbered stage via the second clutch 47B. The clutch outer shaft 31c is relatively rotatably supported on a right end side of the odd-numbered stage main shaft 31a, in adjacent to the power-transmission outer shaft 31b.

The odd-numbered stage main shaft 31a has a left end that is rotatably supported by the upper transmission-case half part 22U via a ball bearing 34 and has a right end that is rotatably supported by the right unit-case cover 28R via a ball bearing 35. The odd-numbered stage main shaft 31a has the driving gears m1, m3, m7, and m5 of the odd-numbered stages, in this order from the left side, which are relatively rotatably mounted via respective needle bearings 56.

The power-transmission outer shaft 31b is relatively rotatably supported at a part from the center toward the right end side of the odd-numbered stage main shaft 31a via a needle bearing 41. The power-transmission outer shaft 31b has a right end, to which an inner clutch 47B$_2$ of the second clutch 47B is relatively unrotatably fitted, and has a left end, to which a transmitting gear 51 is integrally formed to transmit power to the even-numbered stage shaft 32.

The clutch outer shaft 31c is rotatably supported at a part from the power-transmission outer shaft 31b toward the outside in the right direction of the odd-numbered stage main shaft 31a via a needle bearing 42. The clutch outer shaft 31c has a center to which a primary driven gear 46 is relatively unrotatably fitted. The primary driven gear 46 meshes with a primary driving gear 45 that is fitted to the crankshaft 23. The primary driven gear 46 is disposed between the first clutch 47A, which is arranged on a right side, and the second clutch 47B, which is arranged on a left side.

The first clutch 47A has an outer clutch 47A$_1$. The second clutch 47B has an outer clutch 47B$_1$. These outer clutches 47A$_1$ and 47B$_1$ are respectively fitted to the clutch outer shaft 31c in an integrally rotatable manner. The first clutch 47A has an inner clutch 47A$_2$ that is spline-fitted to the odd-numbered stage main shaft 31a. The second clutch 47B has the inner clutch 47B$_2$ that is spline-fitted to the power-transmission outer shaft 31b.

The crankshaft 23 supplies a rotational driving force, which is reduced at a predetermined reduction ratio by the primary driving gear 45 and the primary driven gear 46 and is transmitted to the clutch outer shaft 31c. The rotational driving force that is transmitted to the clutch outer shaft 31c is transmitted to the odd-numbered stage main shaft 31a or the power-transmission outer shaft 31b, in response to selective connection of the first clutch 47A and the second clutch 47B, which is performed by an oil-hydraulic circuit (not shown).

The output shaft 33 receives power from the transmission T. The output shaft 33 is disposed rearward of the crankshaft 23 while being held between the upper transmission-case half part 22U and the lower transmission-case half part 22D. The output shaft 33 is rotatably supported by the transmission case 22 in the condition in which a left end passes through a ball bearing 39, and a part on the left end side and a right end are held between the upper transmission-case half part 22U and the lower transmission-case half part 22D, respectively via a ball bearing 39 and a needle bearing 40. The left end of the output shaft 33 is inserted into a driving sprocket 33a.

The power-transmission outer shaft 31b of the odd-numbered stage shaft 31 is relatively rotatably supported by the odd-numbered stage main shaft 31a via the needle bearing 41. The power-transmission outer shaft 31b is integrally formed with the transmitting gear 51 that is adjacently disposed on a left side of a ball bearing 36. The transmitting gear 51 transmits power from the odd-numbered stage shaft 31 to the even-numbered stage shaft 32. The power-transmission outer shaft 31b has a right end that is spline-fitted to the inner clutch 47B$_2$ of the second clutch 47B, whereby power from the crankshaft 23 is transmitted and is shut off by the second clutch 47B.

The even-numbered stage shaft 32 has a transmitted gear 52 that is provided on a right end side. The transmitted gear 52 integrally rotates with the even-numbered stage shaft 32. The right end of the output shaft 33 relatively rotatably supports an idle gear 53 via a needle bearing 58. The idle gear 53 meshes with each of the transmitting gear 51 and the transmitted gear 52.

As shown in FIG. 4, the idle gear 53 has a left side to which a first scissors gear 54 is relatively rotatably fitted. The first scissors gear 54 has a diameter approximately the same as an outer diameter of the idle gear 53. The first scissors gear 54 meshes with the transmitting gear 51 and is urged by a spring 54a in a direction opposite to a rotation direction of the transmitting gear 51.

The idle gear 53 has a right side to which a second scissors gear 55 is relatively rotatably fitted. The second scissors gear 55 has a diameter approximately the same as the outer diameter of the idle gear 53. The second scissors gear 55 meshes with the transmitted gear 52 and is urged by a spring 55a in a rotation direction of the idle gear 53.

The idle gear 53 of the output shaft 33 constantly meshes with the transmitting gear 51 of the power-transmission outer shaft 31b of the odd-numbered stage shaft 31 and also constantly meshes with the transmitted gear 52 of the even-numbered stage shaft 32. When the second clutch 47B is connected, a rotational driving force of the crankshaft 23 is transmitted to the even-numbered stage shaft 32, via the second clutch 47B, the transmitting gear 51 of the power-transmission outer shaft 31b, the idle gear 53, and the transmitted gear 52. At this time, the first scissors gear 54, which is provided at the left side of the idle gear 53, prevents backlash between the transmitting gear 51 and the idle gear 53, whereas the second scissors gear 55, which is provided at the right side of the idle gear 53, prevents backlash between the idle gear 53 and the transmitted gear 52. This structure reduces rattle noise that is generated between gears at the time of shifting to the even-numbered stage.

The gear group G that is provided to the transmission T has the following structure.

The four driving gears of the odd-numbered stages: the driving gear m1 with a gear ratio for a first speed, the driving gear m3 with a gear ratio for a third speed, the driving gear m7 with a gear ratio for a seventh speed, and the driving gear m5 with a gear ratio for a fifth speed, in this order from the left side, are respectively relatively rotatably supported by the odd-numbered stage main shaft 31a of the odd-numbered stage shaft 31 via the respective needle bearings 56.

The four driving gears of the even-numbered stages: the driving gear m2 with a gear ratio for a second speed, the driving gear m4 with a gear ratio for a fourth speed, the driving gear m8 with a gear ratio for an eighth speed, and the driving gear m6 with a gear ratio for a sixth speed, in this order from the left side, are respectively relatively rotatably supported by the even-numbered stage shaft 32 via respective needle bearings 57.

The four driven gears: the driven gears c1, c2, c3, and c4, are provided to the output shaft 33, in this order from the left side. These driven gears c1 to c4 are respectively spline-fitted to the output shaft 33 and are respectively integrally rotates with the output shaft 33.

The driving gear m1 of the odd-numbered stage shaft 31 and the driving gear m2 of the even-numbered stage shaft 32 are paired and, both constantly mesh with the driven gear c1 of the output shaft 33. Similarly, the driving gears m3, m7, and m5 of the odd-numbered stage shaft 31 are respectively paired with the driving gears m4, m8, and m6 of the even-numbered stage shaft 32, and the paired driving gears respectively constantly mesh with the driven gears c2, c3, and c4.

As shown in FIG. 4, the odd-numbered stage main shaft 31a of the odd-numbered stage shaft 31 is provided with a sleeve 61 that is positioned between the driving gear m1 for the first speed and the driving gear m3 for the third speed and also between the driving gear m7 for the seventh speed and the driving gear m5 for the fifth speed. The sleeve 61 is included in a gear switching mechanism 60. The sleeve 61 is slidable on the odd-numbered stage shaft 31 in the axial direction and is selectively engaged with the adjacent driving gear m1, m3, m5, or m7 via a synchronizer S.

The even-numbered stage shaft 32 is also provided with a sleeve 61 that is positioned between the driving gear m2 for the second speed and the driving gear m4 for the fourth speed and also between the driving gear m8 for the eighth speed and the driving gear m6 for the sixth speed. The sleeve 61 is included in a gear switching mechanism 60. The sleeve 61 is slidable on the even-numbered stage shaft 32 in the axial direction and is selectively engaged with the adjacent driving gear m2, m4, m6, or m8 via a synchronizer S.

Figure 7:
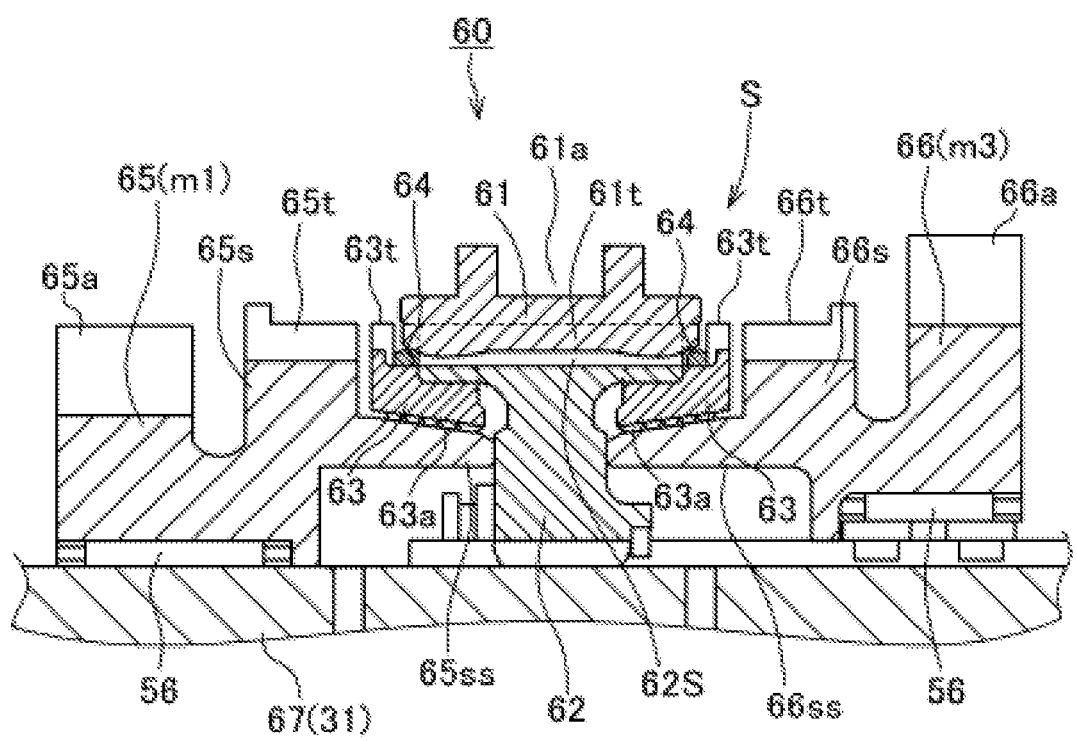
FIG. 7 is a sectional view of the periphery of a gear switching mechanism.
Figure 8:
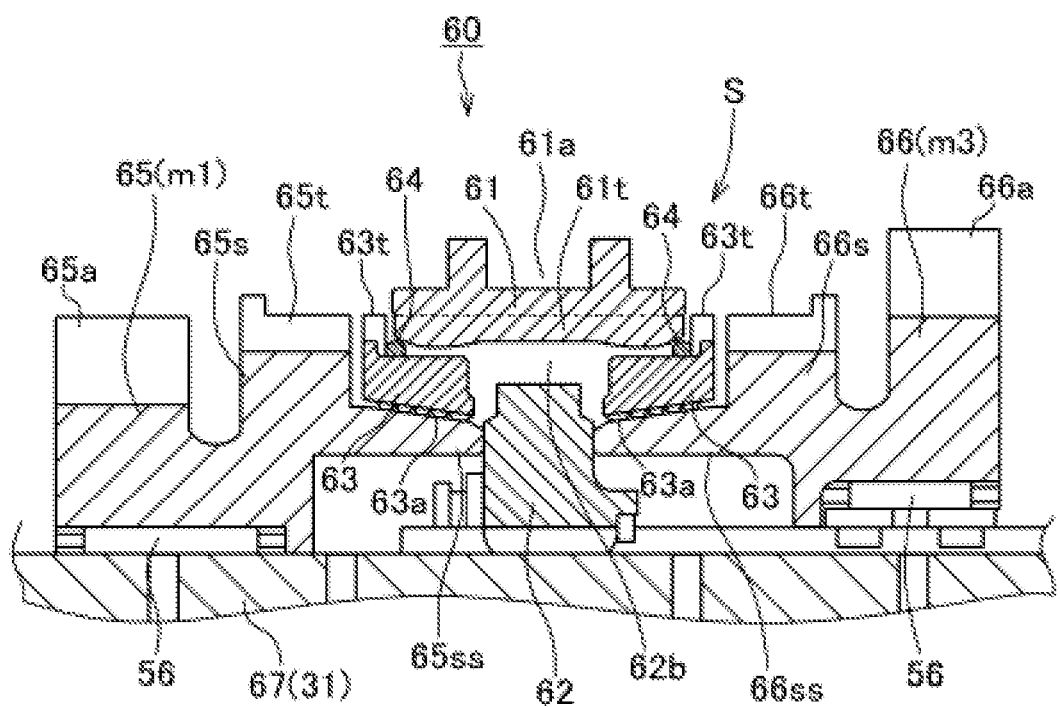
FIG. 8 is a sectional view of the periphery of the gear switching mechanism.

As shown in FIGS. 7 and 8, each of the sleeves 61 is provided with a fork engaging groove 61a and is made movable in the axial direction by a shift fork 91 that engages with the fork engaging groove 61a.

The gear switching mechanism 60 includes the synchronizer S. The synchronizer S is provided between each of the sleeves 61 and the driving gear that is to be engaged with the corresponding sleeve 61. Each of the synchronizers S establishes the corresponding speed stage while synchronizing the sleeve 61 with the driving gear.

The gear switching mechanism 60 and the synchronizer S, which are provided between the driving gear m1 for establishing the first speed stage and the driving gear m3 for establishing the third speed stage, among the driving gears for establishing the speed stages, will be described with reference to FIGS. 7 and 8.

The structures of these gear switching mechanism 60 and synchronizer S also apply to the other gear switching mechanisms 60 and synchronizers S, respectively.

As shown in FIGS. 7 and 8, a shift gear 65 that is represented by the driving gear m1 for the first speed and a shift gear 66 that is represented by the driving gear m3 for the third speed are rotatably supported by a rotation shaft 67 via the needle bearings 56. The rotation shaft 67 corresponds to the odd-numbered stage shaft 31 in this embodiment.

The shift gear 65 has shift gear teeth 65a on an outer circumference as driving gear teeth for the first speed. The shift gear 65 also has gear dog teeth 65t formed on an outer circumference of a cylindrical part 65s that protrudes toward the shift gear 66, which represents the driving gear m3 for the third speed. The cylindrical part 65s, which has the gear dog teeth 65t on the outer circumference, also has a protruding cylindrical part 65ss that is formed by protruding an inner peripheral part.

The shift gear 66 has shift gear teeth 66a on an outer circumference as driving gear teeth for the third speed. The shift gear 66 also has gear dog teeth 66t formed on an outer circumference of a cylindrical part 66s that protrudes toward the shift gear 65, which represents the driving gear m1 for the first speed. The cylindrical part 66s, which has the gear dog teeth 66t on the outer circumference, also has a protruding cylindrical part 66ss that is formed by protruding an inner peripheral part.

The sleeve 61 is spline-fitted to an outer circumferential surface of a hub 62 in a slidable manner in the axial direction. The hub 62 is spline-fitted to the odd-numbered stage main shaft 31a while movement in the axial direction is inhibited. The hub 62 includes spline teeth 62s that are formed on an outer circumferential surface. The spline teeth 62s engage with sleeve teeth 61t that are formed on an inner circumferential surface of the sleeve 61.

Among the multiple spline teeth 62s that are formed on the outer circumferential surface of the hub 62, the spline teeth 62s at an interval of 120 degrees in the circumferential direction are cut off to form three cut-off grooves 62b.

The sleeve teeth 61t are circularly arrayed on the inner circumferential surface of the sleeve 61 and are respectively tapered at each end.

The fork engaging groove 61a that engages with the shift fork 91 is formed on the outer circumference of the sleeve 61.

The protruding cylindrical part 65ss of the shift gear 65 and the sleeve 61 have a blocking ring 63 and a synchronizing spring 64 that are disposed therebetween. Similarly, the protruding cylindrical part 66ss of the shift gear 66 and the sleeve 61 have a blocking ring 63 and a synchronizing spring 64 that are disposed therebetween. The blocking ring 63 is formed with ring teeth 63t that have a diameter approximately the same as the diameter of the gear dog teeth 65t of the shift gear 65 and the diameter of the gear dog teeth 66t of the shift gear 66.

In establishing the speed stage, the sleeve 61 that engages with the shift fork 91 is slid to the shift gear 66 by the gear shift operation mechanism 70, from a neutral state as shown in FIG. 7. Thus, the sleeve 61 comes into contact with a left surface of the synchronizing spring 64, and the blocking ring 63 comes into contact with a right surface of the synchronizing spring 64, to start synchronizing of the sleeve 61.

This synchronizing operation of the synchronizer S will be described with reference to FIGS. 9A to 9G.

Figure 9:
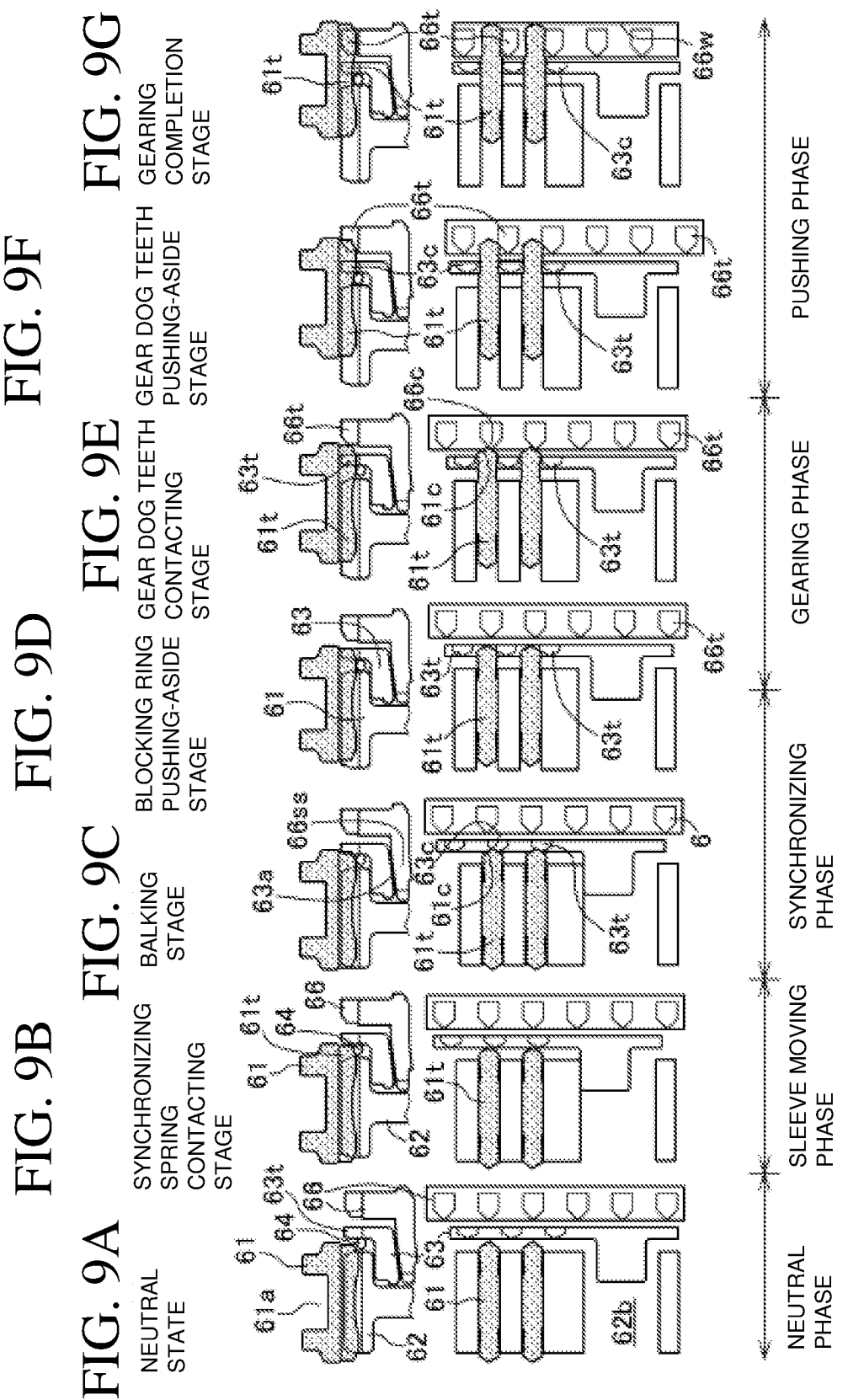
FIGS. 9A to 9G are schematic drawings showing a synchronizing operation of a synchronizer in time sequence.

FIG. 9A shows a neutral state before shifting of the gears is started. In the neutral state, the sleeve 61 is at a neutral position, and the sleeve teeth 61t are not in contact with the synchronizing springs 64 in the left-right direction and thereby do not start the synchronizing operation.

After the shifting of the gears is started, the sleeve 61 moves in the right direction. As shown in FIG. 9B, the sleeve teeth 61t of the sleeve 61 come into contact with the synchronizing spring 64 and is able to press the blocking ring 63 toward the shift gear 66 via the synchronizing spring 64. This movement is in a synchronizing spring contacting stage.

When the sleeve 61 further moves in the right direction, as shown in FIG. 9C, the blocking ring 63 is pressed toward the shift gear 66, and a frictional force is generated between an inner circumferential surface 63a of the blocking ring 63 and the protruding cylindrical part 66ss of the shift gear 66. Meanwhile, tips of the sleeve teeth 61t come into contact with tips of the ring teeth 63t, and then, chamfered surfaces 61c of the sleeve teeth 61t come into contact with chamfered surfaces 63c of the ring teeth 63t, whereby synchronization is started. This movement is in a balking stage.

Then, when the sleeve 61 further moves in the right direction, as shown in FIG. 9D, the sleeve teeth 61t mesh with the ring teeth 63t by pushing the ring teeth 63t aside, which results in integral rotation of the sleeve 61 and the blocking ring 63. This movement is in a blocking ring pushing-aside stage.

When the sleeve 61 further moves in the right direction, as shown in FIG. 9E, the tips of the sleeve teeth 61t come into contact with tips of the gear dog teeth 66t of the shift gear 66, and then, the chamfered surfaces 61c of the sleeve teeth 61t come into contact with chamfered surfaces 66c of the gear dog teeth 66t. This movement is in a gear dog teeth contacting stage.

When the sleeve 61 further moves in the right direction, as shown in FIG. 9F, the sleeve teeth 61t mesh with the gear dog teeth 66t by pushing the gear dog teeth 66t aside, resulting in completion of the synchronization. This movement is in a gear dog teeth pushing-aside stage.

When the sleeve 61 further moves in the right direction, as shown in FIG. 9G, the sleeve teeth 61t completely mesh with the gear dog teeth 66t, and the sleeve teeth 61t come to a gear wall 66w of the shift gear 66, whereby the shifting of the gears is completed. As a result, the sleeve 61, including the odd-numbered stage shaft 31, and the shift gear 66, integrally rotate. This movement is in a gearing completion stage.

The synchronizer S operates as described above, thereby engaging the sleeve 61 with the shift gear 66 while synchronizing them with each other.

Next, the gear shift operation mechanism 70 for moving the sleeve 61 of the gear switching mechanism 60 will be described with reference to FIGS. 5 and 6.

The gear shift operation mechanism 70 includes a shift motor 72 that functions as an actuator, a reduction gear mechanism 73, a shift spindle 74, a master arm 75, an intermittently sending mechanism 76, the shift drum 80, a shift fork shaft 90, and the shift fork 91. FIG. 6 shows a structure for changing the speed stage of the transmission mechanism 30. The shift motor 72 provides a rotational driving force, which is reduced by the reduction gear mechanism 73. The reduced rotational driving force rotates the shift spindle 74 and causes the master arm 75 to rotate integrally with the shift spindle 74, thereby making the intermittently sending mechanism 76 intermittently rotate the shift drum 80 to move the shift fork 91. As a result, a target sleeve 61 of the gear switching mechanism 60 is moved in the axial direction to change the speed stage of the transmission mechanism 30. The shift motor 72 operates in accordance with a duty ratio DR that is determined on the basis of an instruction from the gear shift control system 100.

The shift motor 72 is fixed to the left unit-case cover 28L on the left side of the lower transmission-case half part 22D. The reduction gear mechanism 73 is provided between the lower transmission-case half part 22D and the left unit-case cover 28L. The reduction gear mechanism 73 includes a driving gear 73a, first and second gears 73b and 73c, and a driven gear 73d. The driving gear 73a is integrally formed to a motor shaft 72a of the shift motor 72. The first and second gears 73b and 73c are a large gear and a small gear. The driven gear 73d is fitted to the shift spindle 74.

The shift spindle 74 is rotatably supported by the lower transmission-case half part 22D via bearings, at a part in the vicinity of a left end and at a part in the vicinity of a right end. The master arm 75 is welded to a part in the vicinity of the right end of the shift spindle 74 to make the shift spindle 74 and the master arm 75 integrally rotate.

The shift drum 80 is formed into a hollow cylindrical shape. The shift drum 80 has a right end part and a left end part that are rotatably supported by the lower transmission-case half part 22D respectively via a ball bearing 88 and a needle bearing 89, so as to be parallel to the rotation axis of the crankshaft 23, under the odd-numbered stage shaft 31.

The right end part of the shift drum 80 is provided with the intermittently sending mechanism 76 that intermittently rotates the shift drum 80. The intermittently sending mechanism 76 is connected to the master arm 75 via a pin 76a. The shift drum 80 includes four leading grooves 80a that are provided on a radial outer circumferential surface. The shift drum 80 is provided with a shift drum angle sensor, which is not shown, and a rotated angle of the shift drum 80 from a predetermined angle is measured.

As shown in FIGS. 3 and 5, the shift fork shafts 90 are disposed upward and rearward of the shift drum 80 and are supported by the lower transmission-case half part 22D in parallel to the shift drum 80, while both ends of the shift fork shafts 90 are fitted to the lower transmission-case half part 22D. The shift fork shafts 90 support four shift forks 91 in an individually movable manner in the axial direction.

As shown in FIG. 5, the shift fork 91 includes a base 91a, a fork part 91c, and a pin part 91d. The base 91a is formed with a shaft insertion hole 91b to which the shift fork shaft 90 is inserted. The fork part 91c extends branchingly from the base 91a in a direction perpendicular to the shift fork shaft 90. The pin part 91d is provided at a side opposite to the fork part 91c across the base 91a.

The fork part 91c engages with the fork engaging groove 61a, which is formed in the sleeve 61.

The pin part 91d engages with a corresponding leading groove 80a, which is formed on the outer circumferential surface of the shift drum 80.

When the shift drum 80 is driven by the shift motor 72 of the gear shift operation mechanism 70 and is thereby rotated, the shift fork 91 is guided by the corresponding leading groove 80a, which is formed on the outer circumferential surface of the shift drum 80, and moves in the axial direction. Thus, the corresponding sleeve 61 is moved in the axial direction, and the speed stage is changed.

The transmission T is provided with a shift spindle angle sensor 103 that measures a rotation angle of the shift spindle 74. The rotation angle of the shift spindle 74, which is rotated by the shift motor 72, is used to calculate a position in the axial direction of the sleeve 61. From this point of view, the shift spindle angle sensor 103 corresponds to a sleeve position measuring unit 102 in this embodiment.

Although the sleeve 61 with no shift gear is used in the gear switching mechanism 60 in this embodiment, a shifter gear with a shift gear that is integrally formed to a sleeve may also be used.

As shown in FIG. 3, the transmission T is configured so that a diameter d3 of the idle gear 53 will be greater than a diameter d1 of the transmitting gear 51 and a diameter d2 of the transmitted gear 52. That is, the diameters of the transmitting gear 51 and the transmitted gear 52 are made small, and only the idle gear 53 is a large diameter gear. This structure enables reducing dimensions of the power unit P as viewed from a side, compared with a structure in which the idle gear has a small diameter, and the transmitting gear and the transmitted gear have large diameters.

On the other hand, the transmitting gear 51 and the transmitted gear 52, which respectively have the diameter d1 and the diameter d2 that are smaller than the diameter d3 of the idle gear 53, both have small numbers of teeth. It is difficult to finely adjust the ratio between the transmitting gear 51 and the transmitted gear 52 with such small numbers of teeth.

Figure 10:
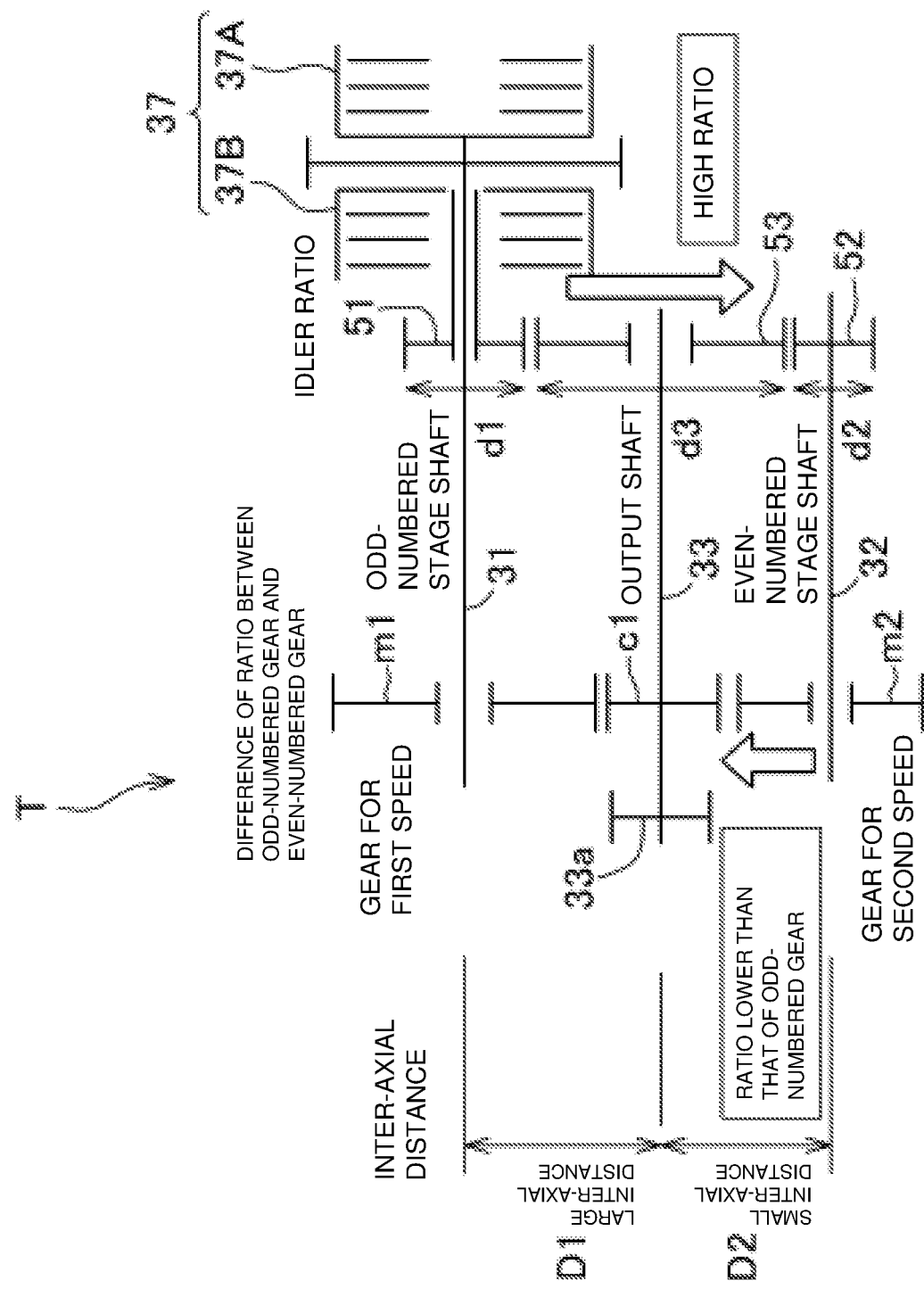
FIG. 10 is a schematic drawing of the transmission.
Figure 11:
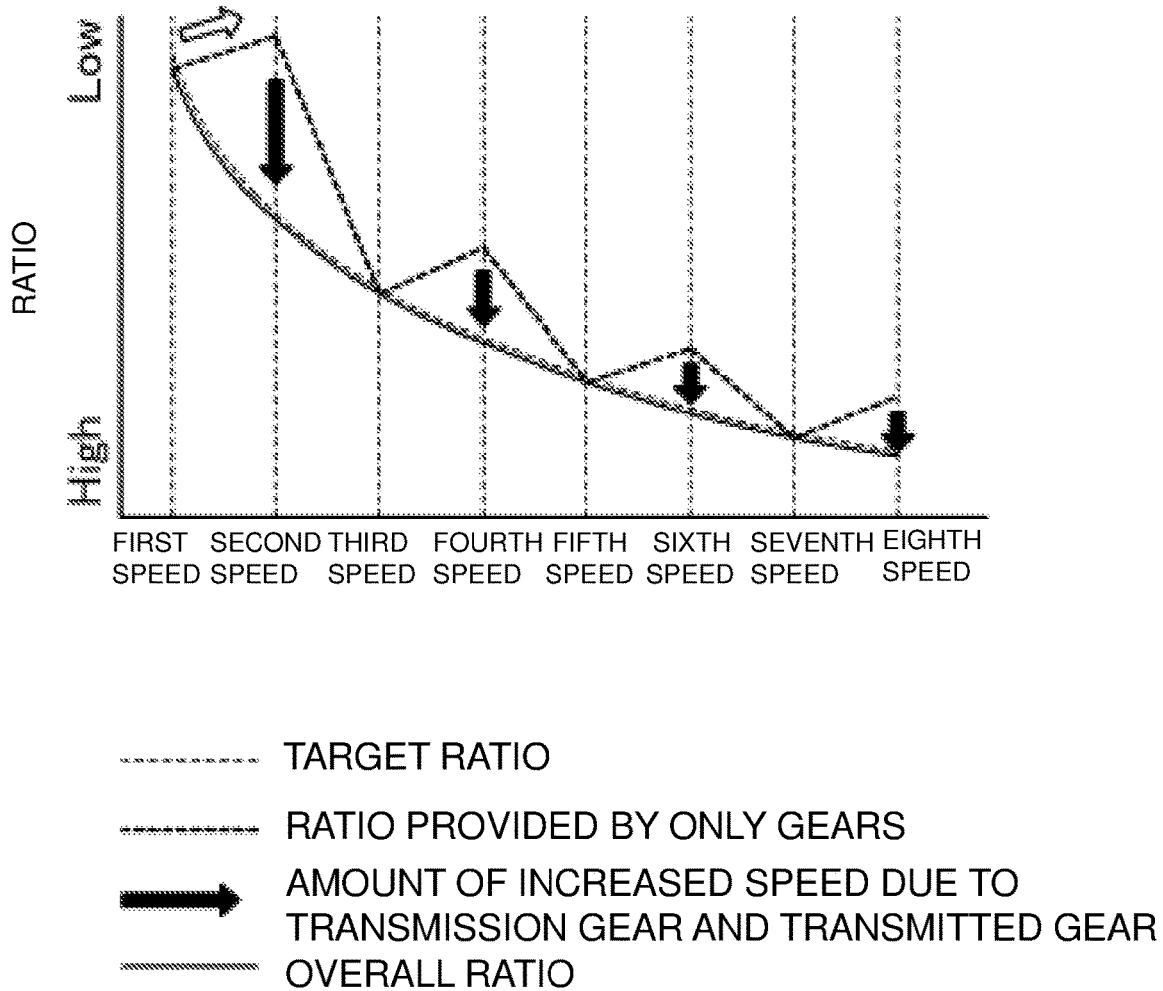
FIG. 11 shows a relationship between a change of speed stage and a ratio of the transmission.

FIG. 10 is a schematic drawing of the transmission T and shows the driving gear m1 for the first speed and the driving gear m2 for the second speed as examples among the driving gears. FIG. 11 shows a ratio for each speed stage. The dashed thin line shows a target ratio. The dashed thick line shows a ratio due to changing of speed only by each of the gears m1 to m8 and c1 to c4. The black arrow shows an amount of increased speed due to the transmitting gear 51 and the transmitted gear 52. The solid line shows an overall ratio obtained by adding the amount of increased speed due to the transmitting gear 51 and the transmitted gear 52 to the ratio of each of the gears m1 to m8 and c1 to c4.

As shown in FIGS. 3 and 10, the odd-numbered stage shaft 31, the even-numbered stage shaft 32, and the output shaft 33 are arranged so that the center distance D1 between the odd-numbered stage shaft 31 and the output shaft 33 will be longer than the center distance D2 between the even-numbered stage shaft 32 and the output shaft 33. That is, the diameter d1 of the transmitting gear 51 is made larger than the diameter d2 of the transmitted gear 52, and thus, the ratio is greatly increased by the transmission from the transmitting gear 51 to the transmitted gear 52. Adjustment of the ratios of the gears m1 to m8 and c1 to c4 are easier than that of the transmitting gear 51 and the transmitted gear 52 because the gears m1 to m8 and c1 to c4 have diameters larger than those of the transmitting gear 51 and the transmitted gear 52. Thus, the ratio of the even-numbered speed stage is finely adjusted to be lower than the ratio of the odd-numbered speed stage to cause a decrease in speed, whereby the target ratio is achieved.

Next, a gear shift control will be described with reference to FIGS. 9A to 9G and 12. The gear shift control is performed by controlling a pushing force F that pushes the sleeve 61 to the shift gear 66 in shifting the gears. The pushing force F is proportional to a duty ratio DR of the shift motor 72 of the gear shift operation mechanism 70 and is controlled by means of the duty ratio DR of the shift motor 72 that is controlled by the gear shift control system 100.

The pushing force F in the transmission T is controlled in each of the following phases by the gear shift control system 100. Which phase the transmission T is in is determined from position information of the sleeve 61 or is directly determined from an angle of the shift drum 80. The position information of the sleeve 61 is calculated on the basis of an angle α of the shift spindle 74, which is measured by the shift spindle angle sensor 103.

(1) Neutral Phase

In the neutral phase, the sleeve 61 is in a neutral state in which the sleeve 61 does not move to the shift gear 66 and does not come into contact with each of the blocking ring 63 and the synchronizing spring 64, thereby not starting synchronization with the blocking ring 63 and the shift gear 66. During the neutral phase, the duty ratio DR of the shift motor 72 is 0%, whereby the driving force is not generated by the shift motor 72, and the pushing force F is not generated.

(2) Sleeve Moving Phase

The sleeve moving phase starts when the sleeve 61 starts moving to the shift gear 66 due to being driven by the shift motor 72 that receives a signal from the gear shift control system 100, and the sleeve moving phase ends immediately before the sleeve 61 starts synchronizing with the shift gear 66. At the start of synchronization, the sleeve teeth 61t come into contact with the synchronizing spring 64, and the blocking ring 63 is pressed against the protruding cylindrical part 66ss of the shift gear 66 and starts generating friction. During the sleeve moving phase, a feedback control is executed by using a difference of a current position from a target position of the sleeve 61 as an input value for controlling the shifting of the gears. The target position in this phase is a position of the sleeve 61, at which the sleeve 61 starts synchronizing with the shift gear 66 while the blocking ring 63 is pressed against the protruding cylindrical part 66ss of the shift gear 66 and starts generating friction. When the distance from the target position is greater, the duty ratio DR of the shift motor 72 is increased to increase the pushing force F. When the distance from the target position becomes smaller, the duty ratio DR of the shift motor 72 is decreased to decrease the pushing force F. This control reduces the time required for starting the synchronization.

(3) Synchronizing Phase

The synchronizing phase starts at the start of synchronization of the sleeve 61 with the shift gear 66 and ends before the start of a gearing phase, which is described later. During the synchronizing phase, the duty ratio DR of the shift motor 72 is set at a constant synchronizing-phase duty ratio DRs to make the pushing force F be a constant synchronizing-phase pushing force Fs. The synchronizing-phase duty ratio DRs is determined on the basis of a number Nes of rotation of the engine in the synchronizing phase, which is measured at the start of the synchronizing phase.

(4) Gearing Phase

The gearing phase starts at the start of gearing and ends at the end of the gearing. At the start of the gearing phase, the sleeve 61 reaches a position so as to have a specific distance in a side opposite to the shift gear 66, from a position in the axial direction of the sleeve 61 when the tips of the sleeve teeth 61t of the sleeve 61 come into collision with the tips of the ring teeth 63t of the blocking ring 63. The specific distance is determined in advance. That is, the gearing phase starts when the sleeve 61 reaches a position, thereby having a predetermined clearance between the tips of the sleeve teeth 61t and the gear dog teeth 66t.

In the gearing phase, after the gearing is started, the sleeve teeth 61t of the sleeve 61 push aside the ring teeth 63t of the blocking ring 63 and come into collision with the gear dog teeth 66t of the shift gear 66 to start pushing the gear dog teeth 66t aside.

The gearing phase ends when the sleeve 61 reaches a position so as to have a specific distance in a side of the shift gear 66, from a position in the axial direction of the sleeve 61 when the sleeve teeth 61t come into collision with the gear dog teeth 66t. The specific distance is determined in advance. That is, the gearing phase ends when the sleeve 61 reaches a position, thereby making the tips of the sleeve teeth 61t overlap the gear dog teeth 66t by a predetermined length.

During the gearing phase, the duty ratio DR of the shift motor 72 is set at a constant gearing-phase duty ratio DRg, whereby the pushing force F is a constant gearing-phase pushing force Fg. The gearing-phase duty ratio DRg is determined on the basis of a number Neg of rotation of the engine in the gearing phase, which is measured at the start of the gearing phase.

(5) Pushing Phase

The pushing phase starts at the end of the gearing phase and ends when the following state is obtained. That is, the sleeve teeth 61t come to the gear wall 66w of the shift gear 66 by further pushing aside the gear dog teeth 66t of the shift gear 66. At this time, the shift spindle 74 of the gear shift operation mechanism 70 completely rotates to make the shift drum 80 rotate by a predetermined angle via the intermittently sending mechanism 76 for shifting gears by one speed stage.

During the pushing phase, the feedback control is executed by using a difference of the current position from a target position of the sleeve 61 as an input value for controlling the shifting of the gears. When the distance from the target position is greater, the duty ratio DR of the shift motor 72 is increased to increase the pushing force F. When the distance from the target position becomes smaller, the duty ratio DR of the shift motor 72 is decreased to decrease the pushing force F. This control reduces the time required for completing shifting the gears.

Figure 12:
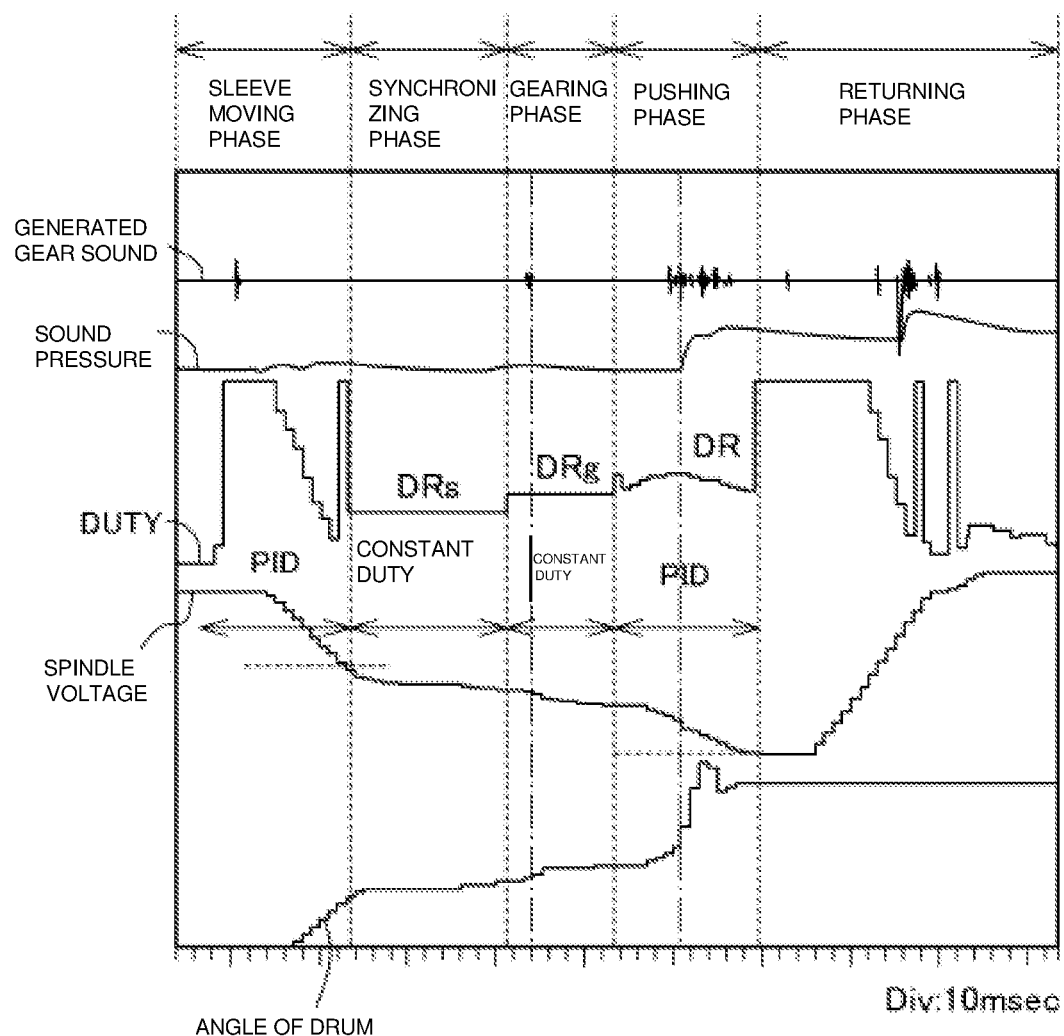
FIG. 12 is a graph showing a generated gear sound G, sound pressure, a duty ratio of a shift motor, and a rotation angle of a shift drum in a gear shift operation of the transmission.

As shown in FIG. 12, the gearing-phase duty ratio DRg that is constant during the gearing phase is calculated in accordance with a predetermined map, on the basis of the number Neg of rotation of the engine in the gearing phase, which is measured at the start of the gearing phase. The map is exemplified in FIG. 13.

The map specifies a number of rotation of the engine: a number Negs of rotation for starting changing the driving force in the gearing phase, and a number Negf of rotation for finishing changing the driving force in the gearing phase, which is set higher than the number Negs of rotation for starting changing the driving force in the gearing phase. While the number Neg of rotation of the engine in the gearing phase is between these numbers Negs and Negf, it is set that, with increase in the number Neg of rotation of the engine in the gearing phase, the gearing-phase duty ratio DRg increases, that is, the gearing-phase pushing force Fg increases.

When the number Neg of rotation of the engine in the gearing phase is lower than the number Negs of rotation for starting changing the driving force in the gearing phase, the gearing-phase duty ratio DRg is controlled to be a predetermined gearing-phase first fixed value DRg1 regardless of the number Neg of rotation of the engine in the gearing phase. The gearing-phase first fixed value DRg1 is not greater than a calculated gearing-phase duty ratio DRgs at the number Negs of rotation for starting changing the driving force in the gearing phase. That is, the gearing-phase pushing force Fg is controlled to be a predetermined gearing-phase first fixed value Fg1 that is a gearing-phase pushing force Fgs or less.

When the number Neg of rotation of the engine in the gearing phase is higher than the number Negf of rotation for finishing changing the driving force in the gearing phase, the gearing-phase duty ratio DRg is controlled to be a predetermined gearing-phase second fixed value DRg2 regardless of the number Neg of rotation of the engine in the gearing phase. The gearing-phase second fixed value DRg2 is not less than a calculated gearing-phase duty ratio DRgf at the number Negf of rotation for finishing changing the driving force in the gearing phase. That is, the gearing-phase pushing force Fg is controlled to be a predetermined gearing-phase second fixed value Fg2 that is a gearing-phase pushing force Fgf or greater.

In the transmission T of this embodiment, the number Negs of rotation for starting changing the driving force in the gearing phase is set at approximately 2000 rpm, the number Negf of rotation for finishing changing the driving force in the gearing phase is set at approximately 5000 rpm, the gearing-phase first fixed value DRg1 is set at approximately 40%, and the gearing-phase second fixed value DRg2 is set at approximately 85%. The engine sound rapidly increases between 2000 to 5000 rpm. The number of rotation of the engine: 3000 rpm or less, is used primarily in cruising. In view of this, this embodiment is designed to reduce shifting noise at the time when the number of rotation of the engine is 3000 rpm or less and to improve the shifting speed at the time when the number of rotation of the engine is 3000 rpm or greater because a driver intentionally operates for acceleration in most cases at that time.

As in the case of the gearing phase, in the synchronizing phase, the synchronizing-phase duty ratio DRs is calculated in accordance with a predetermined map by using a number Nes of rotation of the engine in the synchronizing phase, which is measured at the start of the synchronizing phase. Thus, the pushing force F is controlled to be a constant synchronizing-phase pushing force Fs.

The map specifies a number of rotation of the engine: a number Ness of rotation for starting changing the driving force in the synchronizing phase, and a number Nesf of rotation for finishing changing the driving force in the synchronizing phase, which is set higher than the number Ness of rotation for starting changing the driving force in the synchronizing phase. While the number Nes of rotation of the engine in the synchronizing phase is between these numbers Ness and Nesf, it is set that, with increase in the number Nes of rotation of the engine in the synchronizing phase, the synchronizing-phase duty ratio DRs increases, that is, the synchronizing-phase pushing force Fs increases.

When the number Nes of rotation of the engine in the synchronizing phase is lower than the number Ness of rotation for starting changing the driving force in the synchronizing phase, the synchronizing-phase duty ratio DRs is controlled to be a predetermined synchronizing-phase first fixed value DRs1 regardless of the number Nes of rotation of the engine in the synchronizing phase. The synchronizing-phase first fixed value DRs1 is not greater than a calculated synchronizing-phase duty ratio DRss at the number Ness of rotation for starting changing the driving force in the synchronizing phase. That is, the synchronizing-phase pushing force Fs is controlled to be a predetermined synchronizing-phase first fixed value Fs1 that is a synchronizing-phase pushing force Fss or less.

When the number Nes of rotation of the engine in the synchronizing phase is higher than the number Nesf of rotation for finishing changing the driving force in the synchronizing phase, the synchronizing-phase duty ratio DRs is controlled to be a predetermined synchronizing-phase second fixed value DRs2 regardless of the number Nes of rotation of the engine in the synchronizing phase. The synchronizing-phase second fixed value DRs2 is not less than a calculated synchronizing-phase duty ratio DRsf at the number Nesf of rotation for finishing changing the driving force in the synchronizing phase. That is, the synchronizing-phase pushing force Fs is controlled to be a predetermined synchronizing-phase second fixed value Fs2 that is a synchronizing-phase pushing force Fsf or greater.

The map is set so that the gearing-phase pushing force Fg will be greater than the synchronizing-phase pushing force Fs. This is because resistance due to pushing aside of the blocking ring 63 by the sleeve 61 in the gearing phase is greater than friction resistance in the synchronizing phase.

Figure 13:
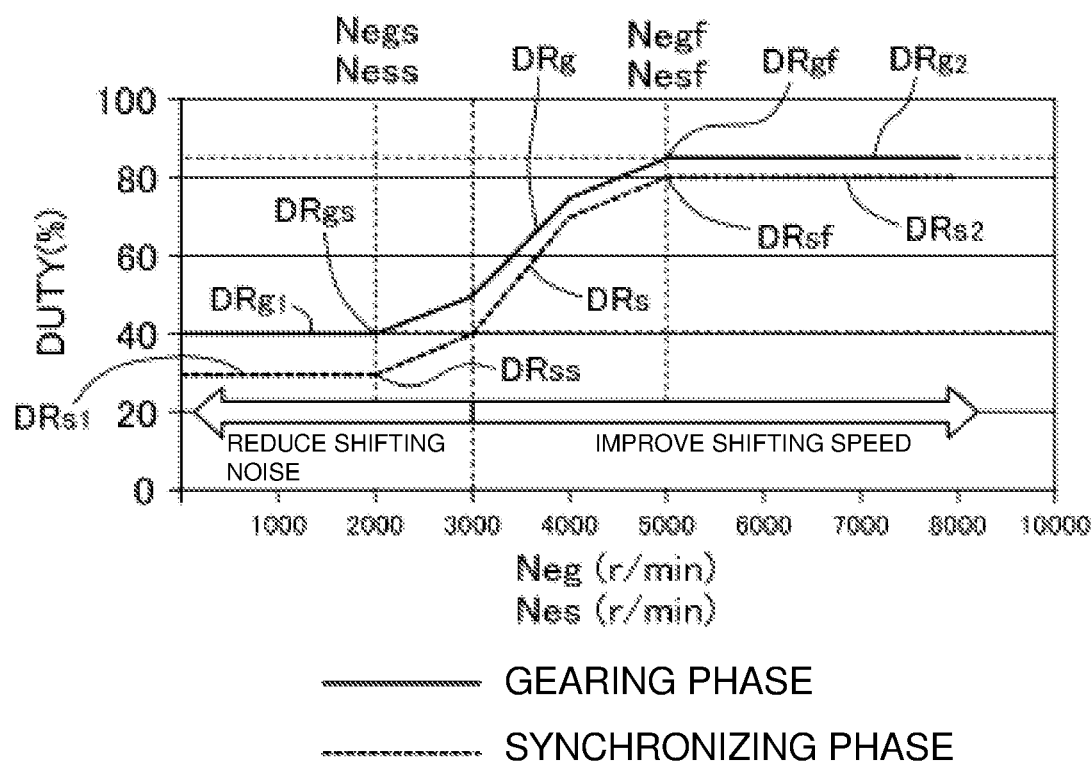
FIG. 13 is a graph showing a gearing-phase duty ratio and a synchronizing-phase duty ratio relative to a number Ne of rotation of an engine.

In this embodiment, as shown in FIG. 13, the number Nesg of rotation for starting changing the driving force in the gearing phase and the number Ness of rotation for starting changing the driving force in the synchronizing phase are set at the same value, which is 2000 rpm, whereas the number Negf of rotation for finishing changing the driving force in the gearing phase and the number Nesf of rotation for finishing changing the driving force in the synchronizing phase are set at the same value, which is 5000 rpm. However, these numbers for the gearing phase and for the synchronizing phase can be respectively set at values other than above values.

The transmission T of this embodiment is thus structured and thereby has effects as described below.

The transmission T of the present invention is configured to be contained in the power unit P for the saddled vehicle having the internal-combustion engine E. The transmission T includes the odd-numbered stage shaft 31 and the even-numbered stage shaft 32 that receive power from the crankshaft 23 of the internal-combustion engine E, the output shaft 33 that receives power from the crankshaft 23, the gear group G that transmits power from the odd-numbered stage shaft 31 and the even-numbered stage shaft 32 to the output shaft 33, and the shift gear 66. The shift gear 66 is included in the multiple gears of the gear group G. The shift gear 66 is relatively rotatably supported by at least one of the odd-numbered stage shaft 31, the even-numbered stage shaft 32, and the output shaft 33 and has the gear dog teeth 66t. The one shaft is numbered 67 herein. The transmission T also includes the gear switching mechanism 60 that has the sleeve 61 and the blocking ring 63. The sleeve 61 is supported by the shaft 67 in the movable manner in the axial direction while relative rotation is inhibited. The blocking ring 63 is disposed between the shift gear 66 and the sleeve 61. The blocking ring 63 has the ring teeth 63t that are interposed between the sleeve teeth 61t of the sleeve 61 and the gear dog teeth 66t. The sleeve 61 moves to make the inner circumferential surface 63a of the blocking ring 63 come into contact with the protruding cylindrical part 66ss of the shift gear 66, whereby the sleeve 61 synchronizes with the shift gear 66. The sleeve 61 further moves to make the sleeve teeth 61t come into contact and mesh with the ring teeth 63t and then make the sleeve teeth 61t come into contact and mesh with the gear dog teeth 66t, whereby the sleeve 61 engages with the shift gear 66, resulting in establishment of the speed stage. The transmission T also includes the gear shift operation mechanism 70 that makes the sleeve 61 move in the axial direction by applying the pushing force F for pushing the sleeve 61 to the shift gear 66. The pushing force F is generated by the driving force of the actuator 72. The transmission T further includes the engine speed measuring unit 101, which measures the number Ne of rotation of the engine of the internal-combustion engine E, the sleeve position measuring unit 102, which measures the position of the sleeve 61, and the gear shift control system 100, which controls the gear switching mechanism 60.

The gear shift control system 100 performs control so that the pushing force F will be the constant gearing-phase pushing force Fg during the gearing phase. The gearing phase starts at the start of gearing when a predetermined time before the tips of the sleeve teeth 61t of the sleeve 61 come into collision with the tips of the gear dog teeth 66t of the shift gear 66, and the gearing phase ends before the end of the gearing when a predetermined time passes after the collision between the sleeve teeth 61t and the gear dog teeth 66t. The gearing-phase pushing force Fg is calculated by applying the number Neg of rotation of the engine in the gearing phase, which is measured at the start of the gearing, in the predetermined map (refer to FIG. 13). The map specifies the number Neg of rotation of the engine in the gearing phase so that the gearing-phase duty ratio DRg will increase with increase in the number Neg of rotation of the engine in the gearing phase. Thus, the pushing force F is controlled so that the gearing-phase pushing force Fg will increase with increase in the number Neg of rotation of the engine in the gearing phase.

The transmission T having such a structure may be incorporated in the power unit P having the internal-combustion engine E. The power unit P that is mounted on the motorcycle 1 is exposed to the outside and is disposed at a position so as to be close to a driver. In this motorcycle 1, the transmission T reduces a hitting sound due to collision between the tips of the sleeve teeth 61t of the sleeve 61 and the gear dog teeth 66t of the shift gear 66 by decreasing the pushing force F, when the number of rotation of the engine is low in the gearing phase, and the hitting sound due to collision between the sleeve 61 and the shift gear 66 is easily heard due to a small engine sound. Moreover, the transmission T provides a high shifting speed by increasing the pushing force F to increase the moving speed of the sleeve 61, when the number of rotation of the engine is high, and the hitting sound due to collision between the sleeve teeth 61*t* and the gear dog teeth 66*t* is buried in a large engine sound and is hard for a driver to hear. Thus, the transmission T satisfies a request of a driver for rapid shifting of the gears, which tends to occur when the number of rotation of the engine is high.

The gear shift control system 100 operates using the number Negs of rotation for starting changing the driving force in the gearing phase, which is set relative to the number Neg of rotation of the engine in the gearing phase. When the number Neg of rotation of the engine in the gearing phase is lower than the number Negs of rotation for starting changing the driving force in the gearing phase, the gear shift control system 100 controls the gearing-phase duty ratio DRg to be the predetermined gearing-phase first fixed value DRg1 regardless of the number Neg of rotation of the engine in the gearing phase. The gearing-phase first fixed value DRg1 is not greater than the calculated gearing-phase duty ratio DRgs at the number Negs of rotation for starting changing the driving force in the gearing phase. In this embodiment, the gearing-phase first fixed value DRg1 is the same as the value of the gearing-phase duty ratio DRgs. Thus, the gearing-phase pushing force Fg is controlled to be the predetermined gearing-phase first fixed value Fg1 that is not greater than the calculated gearing-phase pushing force Fgs at the number Negs of rotation for starting changing the driving force in the gearing phase. In this embodiment, the gearing-phase first fixed value Fg1 is the same as the value of the gearing-phase pushing force Fgs. This operation prevents an excessive decrease in the shifting speed and enables maintaining a lowest acceptable shifting speed when the number Neg of rotation of the engine in the gearing phase is low.

The gear shift control system 100 also operates using the number Negf of rotation for finishing changing the driving force in the gearing phase, which is set relative to the number Neg of rotation of the engine in the gearing phase so as to be higher than the number Negs of rotation for starting changing the driving force in the gearing phase. When the number Neg of rotation of the engine in the gearing phase is higher than the number Negf of rotation for finishing changing the driving force in the gearing phase, the gear shift control system 100 controls the gearing-phase duty ratio DRg to be the predetermined gearing-phase second fixed value DRg2. The gearing-phase second fixed value DRg2 is not less than the calculated gearing-phase duty ratio DRgf at the number Negf of rotation for finishing changing the driving force in the gearing phase. In this embodiment, the gearing-phase second fixed value DRg2 is the same as the value of the gearing-phase duty ratio DRgf. Thus, the gearing-phase pushing force Fg is controlled to be the predetermined gearing-phase second fixed value Fg2 that is not less than the calculated gearing-phase pushing force Fgf at the number Negf of rotation for finishing changing the driving force in the gearing phase. In this embodiment, the gearing-phase second fixed value Fg2 is the same as the value of the gearing-phase pushing force Fgf. This operation prevents an excessive increase in the shifting speed when the number of rotation of the engine is high, thereby reducing a hitting sound due to collision between the sleeve 61 and the shift gear 66, resulting in protection of the sleeve 61 and the shift gear 66. Moreover, this operation makes the change in the shifting speed unnoticeable to a driver. Accordingly, both reduction of the hitting sound due to collision and improvement of the shifting speed are achieved.

The gear switching mechanism 60 performs the gear shift operation including the neutral phase, the sleeve moving phase, the synchronizing phase, the gearing phase, and the pushing phase. During the neutral phase, the sleeve 61 does not move to the shift gear 66. The sleeve moving phase starts when the sleeve 61 starts moving and ends before the blocking ring 63 is pressed against the protruding cylindrical part 66*ss* of the shift gear 66, thereby starting to generate friction, and the sleeve 61 starts synchronizing with the shift gear 66. The synchronizing phase starts at the start of the synchronization and ends before the start of the gearing. The gearing phase starts at the start of the gearing and ends before the end of the gearing after the sleeve teeth 61*t* of the sleeve 61 push aside the ring teeth 63*t* of the blocking ring 63 and come into collision with the gear dog teeth 66*t* of the shift gear 66. The pushing phase starts at the end of the gearing and ends when the sleeve teeth 61*t* come to the gear wall 66*w* of the shift gear 66, whereby shifting of the gears is completed. The gear shift control system 100 executes, in the synchronizing phase, the gear shift control using the constant synchronizing-phase pushing force Fs as the pushing force F. As shown in FIG. 13, the constant synchronizing-phase pushing force Fs is calculated by applying the number Nes of rotation of the engine in the synchronizing phase, which is measured at the start of the synchronizing phase, in the predetermined map. The map specifies the synchronizing-phase pushing force Fs that is set to increase as the number Nes of rotation of the engine in the synchronizing phase increases. Thus, the synchronizing-phase pushing force Fs is controlled on the basis of the number of rotation of the engine at the start of the synchronizing phase, in the synchronizing phase that is immediately before the gearing phase in which a hitting sound occurs due to collision between the sleeve teeth 61*t* of the sleeve 61 and the gear dog teeth 66*t* of the shift gear 66. This operation reduces the hitting sound due to collision and provides rapid shifting of the gears, which may satisfy a request of a driver.

Furthermore, the gear shift control system 100 operates using the number Ness of rotation for starting changing the driving force in the synchronizing phase, which is set relative to the number Nes of rotation of the engine in the synchronizing phase. When the number Nes of rotation of the engine in the synchronizing phase is lower than the number Ness of rotation for starting changing the driving force in the synchronizing phase, the gear shift control system 100 controls the synchronizing-phase pushing force Fs to be the predetermined synchronizing-phase first fixed value Fs1 regardless of the number Nes of rotation of the engine in the synchronizing phase. The synchronizing-phase first fixed value Fs1 is not greater than the calculated synchronizing-phase pushing force Fss at the number Ness of rotation for starting changing the driving force in the synchronizing phase. This operation prevents an excessive decrease in the shifting speed and enables maintaining a lowest acceptable shifting speed when the number of rotation of the engine is low.

The gear shift control system 100 also operates using the number Nesf of rotation for finishing changing the driving force in the synchronizing phase, which is set relative to the number Nes of rotation of the engine in the synchronizing phase so as to be higher than the number Ness of rotation for starting changing the driving force in the synchronizing phase. When the number Nes of rotation of the engine in the synchronizing phase is higher than the number Nesf of rotation for finishing changing the driving force in the synchronizing phase, the gear shift control system 100 controls the synchronizing-phase pushing force Fs to be the predetermined synchronizing-phase second fixed value Fs2. The synchronizing-phase second fixed value Fs2 is not less than the calculated synchronizing-phase pushing force Fsf at the number Nesf of rotation for finishing changing the driving force in the synchronizing phase. This operation prevents an excessive increase in the shifting speed when the number of rotation of the engine is high, thereby reducing a hitting sound due to collision, resulting in protection of the sleeve and the gear. Moreover, this operation makes the change in the shifting speed unnoticeable to a driver. Accordingly, both reduction of the hitting sound due to collision and improvement of the shifting speed are achieved.

During the pushing phase, the feedback control is executed by using a difference of the current position from the target position of the sleeve 61 as an input value for controlling the shifting of the gears. Thus, the pushing force is controlled to increase the shifting speed in the pushing phase. This is because the hitting sound that is generated in the pushing phase is small compared with that in the gearing phase.

The above describes the embodiment of the present invention. However, the present invention is by no means limited to the embodiment described above and may undergo various design modifications without departing from the gist of the present invention. Of course, the elements such as the saddled vehicle and the power unit can variously be modified within the scope of the gist of the present invention.

For convenience of explanation, only the embodiment having the structural configuration in the left-right direction as shown in the drawings is described. However, any other embodiments that fall in the scope of the gist of the present invention are also included in the present invention, although having a structural configuration in the left-right direction, which is different from the above-described structural configuration.

REFERENCE SIGNS LIST

P power unit
E internal-combustion engine
F pushing force
T transmission
G gear group
S synchronizer
Ne number of rotation of engine
Neg number of rotation of engine in gearing phase
Negs number of rotation for starting changing driving force in gearing phase
Negf number of rotation for finishing changing driving force in gearing phase
Fg gearing-phase pushing force
Fgs gearing-phase pushing force at number of rotation for starting changing driving force in gearing phase
Fgf gearing-phase pushing force at number of rotation for finishing changing driving force in gearing phase
Fg1 gearing-phase first fixed value
Fg2 gearing-phase second fixed value
Nes number of rotation of engine in synchronizing phase
Ness number of rotation for starting changing driving force in synchronizing phase
Nesf number of rotation for finishing changing driving force in synchronizing phase
Fs synchronizing-phase pushing force
Fss synchronizing-phase pushing force at number of rotation for starting changing driving force in synchronizing phase
Fsf synchronizing-phase pushing force at number of rotation for finishing changing driving force in synchronizing phase
Fs1 synchronizing-phase first fixed value
Fs2 synchronizing-phase second fixed value
1 motorcycle
20 unit case
23 crankshaft
31 odd-numbered stage shaft
32 even-numbered stage shaft
33 output shaft
60 gear switching mechanism
61 sleeve
61t sleeve teeth
63 blocking ring
63t ring teeth
66 shifting gear
66t gear dog teeth
67 shaft
70 gear shift operation mechanism
72 actuator
100 gear shift control system
101 engine speed measuring unit
102 sleeve position measuring unit

What is claimed is:

1. A transmission to be contained in a power unit (P) for a saddled vehicle having an internal-combustion engine (E), the transmission comprising:
driving shafts (31, 32) that receive power from a crankshaft (23) of the internal-combustion engine (E);
an output shaft (33) that receives the power from the crankshaft (23);
a gear group (G) that transmits the power from the driving shafts (31, 32) to the output shaft (33);
a shift gear (66) included in multiple gears of the gear group (G), the shift gear (66) relatively rotatably supported by at least one shaft (67) of the driving shafts (31, 32) and the output shaft (33) and having gear dog teeth (66t);
a gear switching mechanism (60) having a sleeve (61) and a blocking ring (63), the sleeve (61) supported by the shaft (67) in a movable manner in an axial direction while relative rotation is inhibited, the blocking ring (63) disposed between the shift gear (66) and the sleeve (61), the blocking ring (63) having ring teeth (63t) that are interposed between sleeve teeth (61t) of the sleeve (61) and the gear dog teeth (66t), the sleeve (61) configured to move to make an inner circumferential surface (63a) of the blocking ring (63) come into contact with a protruding cylindrical part (66ss) of the shift gear (66), whereby the sleeve (61) synchronizes with the shift gear (66), the sleeve (61) configured to further move to make the sleeve teeth (61t) come into contact and mesh with the ring teeth (63t) and then make the sleeve teeth (61t) come into contact and mesh with the gear dog teeth (66t), whereby the sleeve (61) engages with the shift gear (66), resulting in establishment of a speed stage; and
a gear shift operation mechanism (70) that makes the sleeve (61) move in the axial direction by applying a pushing force (F) for pushing the sleeve (61) to the shift gear (66), and the pushing force (F) being generated by a driving force of an actuator (72),
wherein the transmission further comprises:

an engine speed measuring unit (101) that measures a number (Ne) of rotation of an engine of the internal-combustion engine (E);

a sleeve position measuring unit (102) that measures a position of the sleeve (61); and a gear shift control system (100) that controls the gear switching mechanism (60), the gear shift control system (100) configured to control the actuator (72) so that the pushing force (F) is controlled to be a constant gearing-phase pushing force (Fg) during a gearing phase, the gearing phase starts a predetermined time before tips of the sleeve teeth (61*t*) of the sleeve (61) come into collision with tips of the gear dog teeth (66*t*) of the shift gear (66) and ends when a predetermined time passes after the collision between the sleeve teeth (61*t*) and the gear dog teeth (66*t*), the gearing-phase pushing force (Fg) is controlled on a basis of a number (Neg) of rotation of the engine in the gearing phase, which is measured at the start of the gearing phase, so as to increase as the number (Neg) of rotation of the engine in the gearing phase increases.

2. The transmission according to claim 1, wherein the gear shift control system (100) operates using a number (Negs) of rotation for starting changing the driving force in the gearing phase, which is set relative to the number (Neg) of rotation of the engine in the gearing phase, when the number (Neg) of rotation of the engine in the gearing phase is lower than the number (Negs) of rotation for starting changing the driving force in the gearing phase, the gear shift control system (100) controls the gearing-phase pushing force (Fg) to be a predetermined gearing-phase first fixed value (Fg1) regardless of the number (Neg) of rotation of the engine in the gearing phase, and the gearing-phase first fixed value (Fg1) is not greater than a calculated gearing-phase pushing force (Fgs) at the number (Negs) of rotation for starting changing the driving force in the gearing phase.

3. The transmission according to claim 2, wherein the gear shift control system (100) operates using a number (Negf) of rotation for finishing changing the driving force in the gearing phase, which is set relative to the number (Neg) of rotation of the engine in the gearing phase so as to be higher than the number (Negs) of rotation for starting changing the driving force in the gearing phase, when the number (Neg) of rotation of the engine in the gearing phase is higher than the number (Negf) of rotation for finishing changing the driving force in the gearing phase, the gear shift control system (100) controls the gearing-phase pushing force (Fg) to be a predetermined gearing-phase second fixed value (Fg2), and the gearing-phase second fixed value (Fg2) is not less than a calculated gearing-phase pushing force (Fgf) at the number (Negf) of rotation for finishing changing the driving force in the gearing phase.

4. The transmission according to claim 1, wherein the gear switching mechanism (60) performs a gear shift operation comprising:

a neutral phase in which the sleeve (61) does not move to the shift gear (66);

a sleeve moving phase that starts when the sleeve (61) starts moving and that ends before the blocking ring (63) is pressed against the protruding cylindrical part (66*ss*) of the shift gear (66), thereby starting to generate friction, and the sleeve (61) starts synchronizing with the shift gear (66);

a synchronizing phase that starts at the start of the synchronization and that ends before the start of the gearing phase;

the gearing phase that starts at the start of gearing and that ends before the end of the gearing after the sleeve teeth (61*t*) of the sleeve (61) push aside the ring teeth (63*t*) of the blocking ring (63) and come into collision with the gear dog teeth (66*t*) of the shift gear (66); and a pushing phase that starts at the end of the gearing phase and that ends when the sleeve teeth (61*t*) come into collision with a gear wall (66*w*) of the shift gear (66), whereby shifting of the gears is completed, the gear shift control system (100) executes, in the synchronizing phase, a gear shift control using a constant synchronizing-phase pushing force (Fs) as the pushing force (F), and the constant synchronizing-phase pushing force (Fs) is controlled on a basis of a number (Nes) of rotation of the engine in the synchronizing phase, which is measured at the start of the synchronizing phase, so as to increase as the number (Nes) of rotation of the engine in the synchronizing phase increases.

5. The transmission according to claim 4, wherein the gear shift control system (100) operates using a number (Ness) of rotation for starting changing the driving force in the synchronizing phase, which is set relative to the number (Nes) of rotation of the engine in the synchronizing phase, when the number (Nes) of rotation of the engine in the synchronizing phase is lower than the number (Ness) of rotation for starting changing the driving force in the synchronizing phase, the gear shift control system (100) controls the synchronizing-phase pushing force (Fs) to be a predetermined synchronizing-phase first fixed value (Fs1) regardless of the number (Nes) of rotation of the engine in the synchronizing phase, and the synchronizing-phase first fixed value (Fs1) is not greater than a calculated synchronizing-phase pushing force (Fss) at the number (Ness) of rotation for starting changing the driving force in the synchronizing phase.

6. The transmission according to claim 5, wherein the gear shift control system (100) operates using a number (Nesf) of rotation for finishing changing the driving force in the synchronizing phase, which is set relative to the number (Nes) of rotation of the engine in the synchronizing phase so as to be higher than the number (Ness) of rotation for starting changing the driving force in the synchronizing phase, when the number (Nes) of rotation of the engine in the synchronizing phase is higher than the number (Nesf) of rotation for finishing changing the driving force in the synchronizing phase, the gear shift control system (100) controls the synchronizing-phase pushing force (Fs) to be a predetermined synchronizing-phase second fixed value (Fs2), and the synchronizing-phase second fixed value (Fs2) is not less than a calculated synchronizing-phase pushing force (Fsf) at the number (Nesf) of rotation for finishing changing the driving force in the synchronizing phase.

7. The transmission according to claim 4, wherein, during the pushing phase, a feedback control is executed by using a difference of a current position from a target position of the sleeve (61) as an input value for controlling the shifting of the gears.

8. The transmission according to claim 2, wherein the gear switching mechanism (60) performs a gear shift operation comprising:

a neutral phase in which the sleeve (61) does not move to the shift gear (66);

a sleeve moving phase that starts when the sleeve (61) starts moving and that ends before the blocking ring (63) is pressed against the protruding cylindrical part (66*ss*) of the shift gear (66), thereby starting to generate friction, and the sleeve (61) starts synchronizing with the shift gear (66);

a synchronizing phase that starts at the start of the synchronization and that ends before the start of the gearing phase;

the gearing phase that starts at the start of gearing and that ends before the end of the gearing after the sleeve teeth (61*t*) of the sleeve (61) push aside the ring teeth (63*t*) of the blocking ring (63) and come into collision with the gear dog teeth (66*t*) of the shift gear (66); and a pushing phase that starts at the end of the gearing phase and that ends when the sleeve teeth (61*t*) come into collision with a gear wall (66*w*) of the shift gear (66), whereby shifting of the gears is completed, the gear shift control system (100) executes, in the synchronizing phase, a gear shift control using a constant synchronizing-phase pushing force (Fs) as the pushing force (F), and the constant synchronizing-phase pushing force (Fs) is controlled on a basis of a number (Nes) of rotation of the engine in the synchronizing phase, which is measured at the start of the synchronizing phase, so as to increase as the number (Nes) of rotation of the engine in the synchronizing phase increases.

9. The transmission according to claim 3, wherein the gear switching mechanism (60) performs a gear shift operation comprising:

a neutral phase in which the sleeve (61) does not move to the shift gear (66);

a sleeve moving phase that starts when the sleeve (61) starts moving and that ends before the blocking ring (63) is pressed against the protruding cylindrical part (66*ss*) of the shift gear (66), thereby starting to generate friction, and the sleeve (61) starts synchronizing with the shift gear (66);

a synchronizing phase that starts at the start of the synchronization and that ends before the start of the gearing phase;

the gearing phase that starts at the start of gearing and that ends before the end of the gearing after the sleeve teeth (61*t*) of the sleeve (61) push aside the ring teeth (63*t*) of the blocking ring (63) and come into collision with the gear dog teeth (66*t*) of the shift gear (66); and a pushing phase that starts at the end of the gearing phase and that ends when the sleeve teeth (61*t*) come into collision with a gear wall (66*w*) of the shift gear (66), whereby shifting of the gears is completed, the gear shift control system (100) executes, in the synchronizing phase, a gear shift control using a constant synchronizing-phase pushing force (Fs) as the pushing force (F), and the constant synchronizing-phase pushing force (Fs) is controlled on a basis of a number (Nes) of rotation of the engine in the synchronizing phase, which is measured at the start of the synchronizing phase, so as to increase as the number (Nes) of rotation of the engine in the synchronizing phase increases.

10. The transmission according to claim 5, wherein, during the pushing phase, a feedback control is executed by using a difference of a current position from a target position of the sleeve (61) as an input value for controlling the shifting of the gears.

11. The transmission according to claim 6, wherein, during the pushing phase, a feedback control is executed by using a difference of a current position from a target position of the sleeve (61) as an input value for controlling the shifting of the gears.

* * * * *